United States Patent [19]

Sable

[11] Patent Number: 5,335,082
[45] Date of Patent: Aug. 2, 1994

[54] METHOD AND APPARATUS FOR USING MONOCHROME IMAGES TO FORM A COLOR IMAGE

[75] Inventor: Arthur J. Sable, Boulder, Colo.

[73] Assignee: Opton Corporation, Boulder, Colo.

[21] Appl. No.: 179,971

[22] Filed: Jan. 10, 1994

Related U.S. Application Data

[63] Continuation-in-part of Ser. No. 866,741, Apr. 10, 1992, Pat. No. 5,294,993.

[51] Int. Cl.⁵ .............................................. G03F 3/00
[52] U.S. Cl. .................................. 358/350; 358/351
[58] Field of Search ............... 358/540, 527, 350, 351, 358/500

[56] References Cited

U.S. PATENT DOCUMENTS

| | | | |
|---|---|---|---|
| 2,593,925 | 4/1952 | Sheldon | 178/6.8 |
| 4,058,832 | 11/1977 | Vagi | 358/110 |
| 4,208,672 | 6/1980 | Ameen et al. | 358/6 |
| 4,339,769 | 6/1982 | Fujita et al. | 358/6 |
| 4,373,156 | 2/1983 | Pfannkuch et al. | 390/703 |
| 4,393,398 | 7/1983 | Horiguchi et al. | 358/76 |
| 4,688,104 | 8/1987 | Wolcott | 358/244 |
| 4,690,150 | 9/1987 | Mayo, Jr. | 128/660 |
| 4,697,594 | 10/1987 | Mayo, Jr. | 128/653 |
| 4,831,436 | 5/1989 | Birgmeir et al. | 358/244 |
| 4,891,691 | 1/1990 | Baba | 358/244 |
| 4,924,302 | 5/1990 | Shiota et al. | 358/244 |
| 4,939,581 | 7/1990 | Shalit | 358/244 |
| 4,942,462 | 7/1990 | Shiota | 358/76 |
| 5,010,414 | 4/1991 | Clapp | 358/244 |

FOREIGN PATENT DOCUMENTS

83/00921 3/1983 PCT Int'l Appl. .

OTHER PUBLICATIONS

Scientific American, Nov. 1961, vol. 205, No. 5, "Maxwell's Color Photograph" Ralph M. Evans (pp. 118-128).

*Primary Examiner*—Stephen Brinich
*Attorney, Agent, or Firm*—Poms, Smith, Lande & Rose

[57] ABSTRACT

A permanent color record (18,20,22) of an image provided by a scanner (10) employed in medical diagnostic procedures is formed on a standard sheet (58) of 8×10 inch black-and-white film by three separate monochromatic record images (18,20,22) of respectively different ones of three color components of the scanner developed image. The film sheet (58) with its three black-and-white images is viewed on the screen of a viewer (116) having three lenses (120,122,124) positioned to project light of three different colors in converging paths through respective ones (222a,222b,222c) of the monochromatic record images and to project three image components in mutual superposition on the viewer screen. The three different color image components on the viewer screen are precisely positioned so that there is no visibly discernible misregistration. Either the three image components on the color record are formed on the sheet film (58) with a predetermined maximum misregistration or the viewing system is adjusted to accomplish such maximum misregistration on the viewer screen. A hard disc memory (430) is used to acquire and electrically store a plurality of color or black-and-white images made in any sequence before selectively extracting all black-and-white or all color images for optical recording.

12 Claims, 13 Drawing Sheets

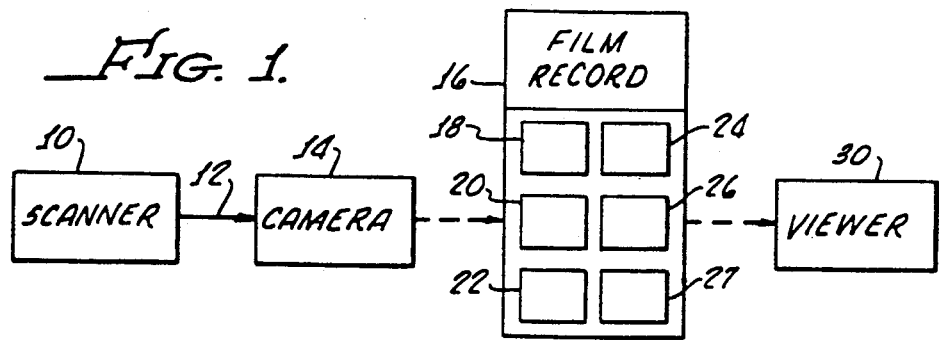
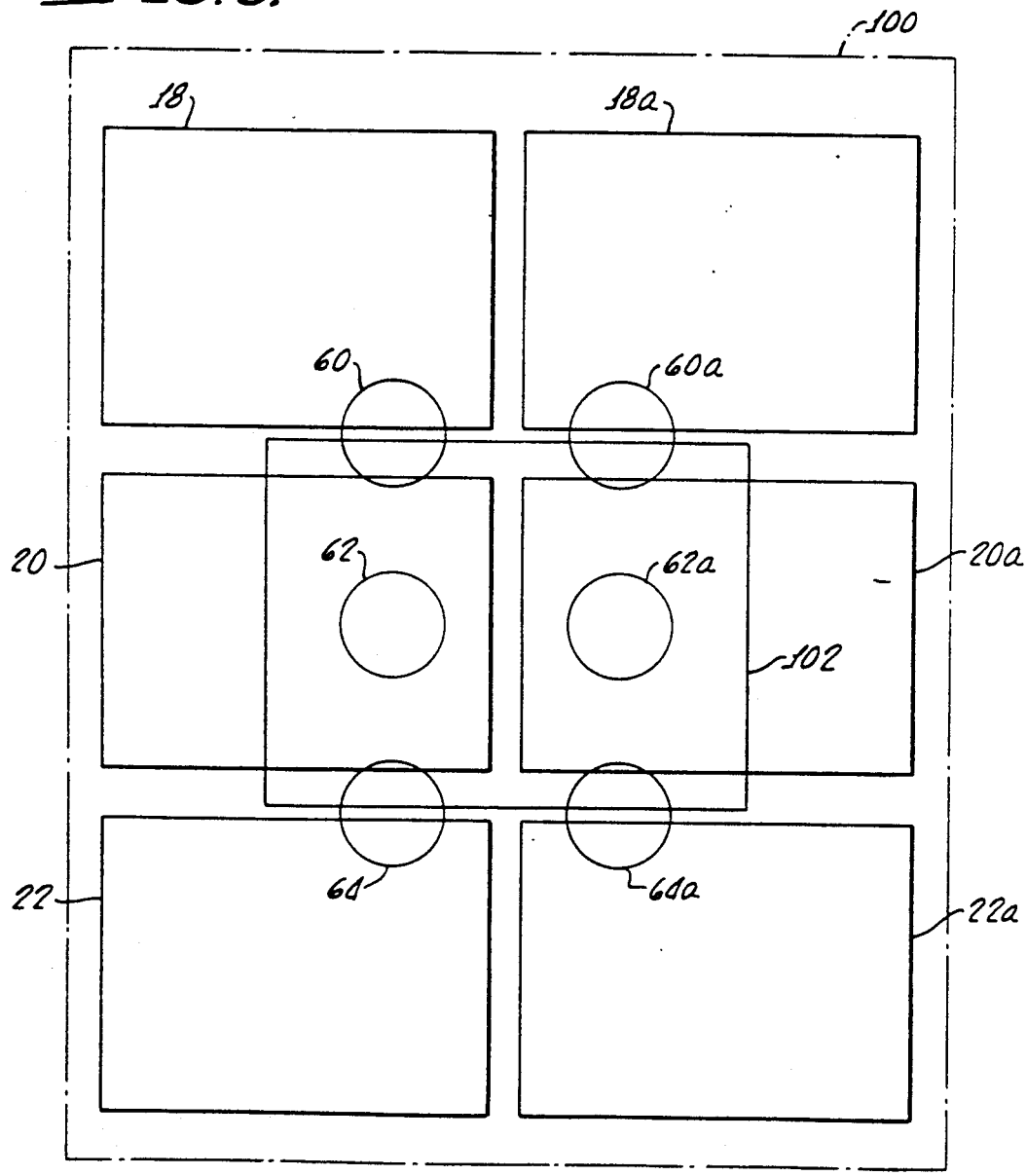

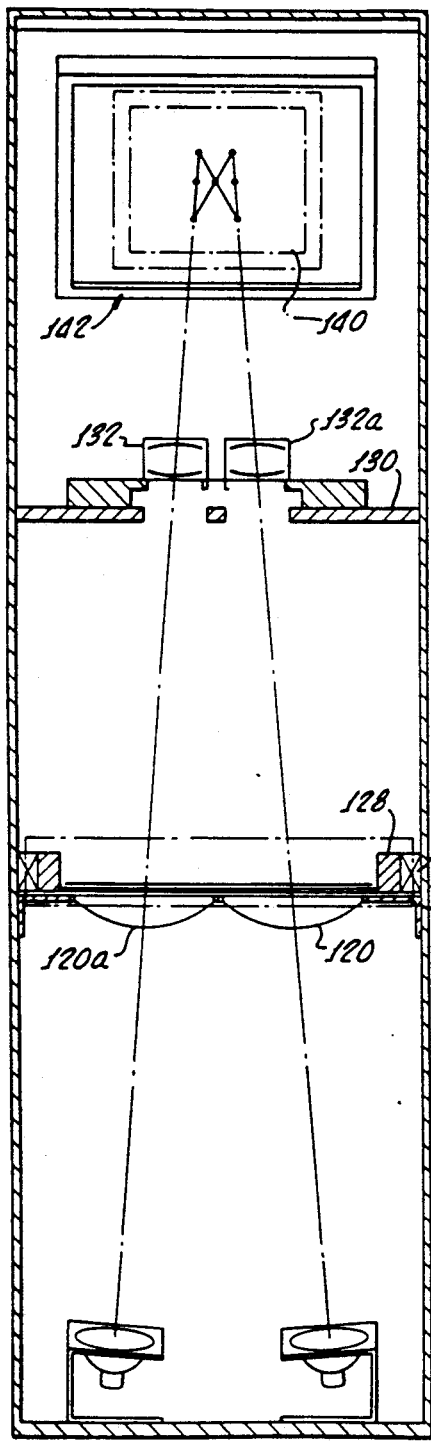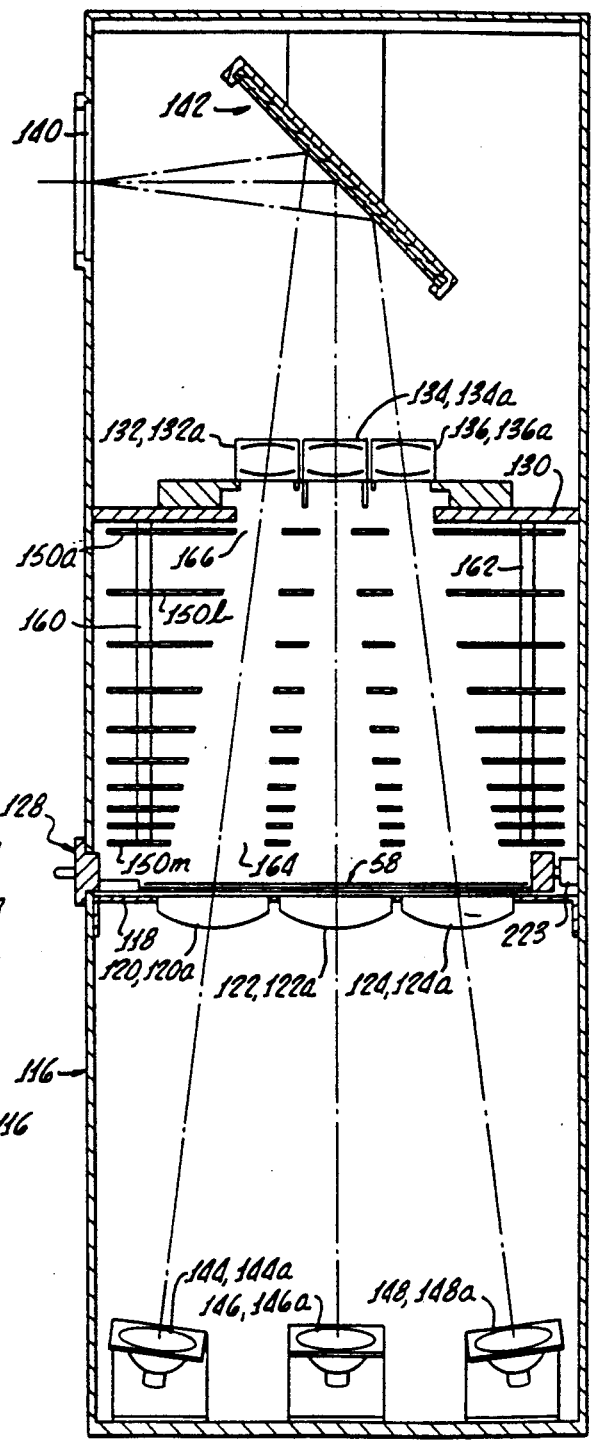

METHOD AND APPARATUS FOR USING MONOCHROME IMAGES TO FORM A COLOR IMAGE

This application is a continuation in part of prior U.S. application Ser. No. 07/866,741 filed Apr. 10, 1992 now U.S. Pat. No. 5,294,993, issued Mar. 15, 1994, for Method and Apparatus for Using Monochrome Images to Form a Color Image.

FIELD OF THE INVENTION

The present invention relates to medical diagnostic imaging and more particularly concerns methods and apparatus for making and displaying multi-color record images.

BACKGROUND OF THE INVENTION

In common radiology clinical environments the diagnostic radiologist seldom sees the patient in person. Examination procedures are performed by trained and qualified radiology technicians, or, in the case of ultrasound imaging, by sonographers. Examination results are communicated to the radiologist diagnostician by means of rapid access hard copy images on film. The film images are interpreted or read by being placed on a light box. The system is quick and cost-effective and conserves scarce resources since it allows both the radiologist and the diagnostician to work with increased efficiency. For such a system it is obvious that quickly available hard copies of very high image quality and high stability are critical.

For information which is presented in black-and-white or gray-scale form, technology to record and view diagnostic films has been highly developed over the years. The common x-ray film system is an example. Film image quality can be very good, having high spatial resolution and a wide gray scale. Access to the permanent record is quick, because developed and dry film images can be delivered within about two minutes after an examination is performed. The film is archivally permanent and cost is low.

In the last few years, however, there has been an increasing use of color in diagnostic images. In some imaging modalities color in the images serves to emphasize selected details or features, such as by using certain colors to designate densities or density gradients beyond preselected thresholds. This adds no new information but facilitates interpretation of information already contained in the image. However, in other areas, such as, for example, in diagnostic ultrasound, color is used to present new information which is not available in the black-and-white gray-scale image. This is done, for example, in color-flow or color-doppler images, wherein information about direction and velocity of blood flow is presented by color coded patches superimposed on the gray scale image everywhere the ultrasound slice intersects a blood vessel. The color-doppler imaging technique is gaining wide acceptance in certain diagnostic procedures.

However, hard copy color images are more time-consuming for development and delivery, and are more expensive and less convenient. Hard copy color images are not as archivally stable and often are not viewable by transmitted light, nor do they always provide true diagnostic image quality. There are of course a number of known methods for obtaining color images, but none has the combination of advantages provided by commonly used black-and-white film.

In conventional color transparency systems a silver halide photographic film, for example, a so called integral tri-pack of three layered light sensitive emulsions is used, where each layer is sensitive to one primary color. During exposure three color records are made as latent images in the three layers. During chemical processing after exposure the latent images are developed as silver images and then converted to dye images in the complementary colors. In this technique, as in most other color systems, the complete color pictorial image in viewable form is assembled on the material which forms the permanent record media.

Another example of color printing is thermal dye transfer. In this process three subtractive primary color dyes, each coated on its own piece of substrate, are successively brought into contact with a receiving substrate and the dyes are selectively transferred by sublimation, activated by a thermal scanning head which passes over the line of contact between the dye and the receiving substrate. After three passes the result again is a complete color pictorial image in viewable form assembled on the material which is the permanent record medium.

Yet another example of a color printing technique is the non-photographic use of ink jet printing. In this process multiple jets of variously colored ink are selectively squirted onto a substrate as it passes by. The result again is a complete color pictorial image in viewable form assembled on the material which is the record medium.

All of the known color hard copy systems employ separate color channels that are combined into a color image on the hard copy material itself. In the prior art the color image itself becomes the permanent pictorial record, with all of the inherent disadvantages of a permanent color record. The black-and-white record provides higher resolution, better gray scale capability, better temporal stability, and simpler and quicker film processing and handling by widely available standard equipment.

Thus it will be seen that the conventional black-and-white photography, which has long been a standard in the industry, has the many advantages of being quick, cheap, convenient, archivally stable, viewable by transmitted light and having high diagnostic image quality. In addition, the widespread and long-term use of black-and-white imaging has made the technique and the required processing equipment and its use well known and widely available. However, as mentioned above, the black-and-white technique lacks the ability to contain certain information that can be included in a multi-color image. Multi-color image techniques previously available, on the other hand, although capable of containing the additional information, lack the many advantages of the standard black-and-white processes.

Accordingly, it is an object of the present invention to provide a multi-color record that is readily viewable while avoiding or minimizing problems of prior art imaging systems.

SUMMARY OF THE INVENTION

In carrying out principles of the present invention in accordance with a preferred embodiment thereof multicolor monochromatic color image component signals, collectively representing a color image of an object, are employed to produce on a common piece of monochromatic film mutually separated monochromatic record image components of respective ones of the color component signals with a predetermined nominal relative positioning. The separated monochromatic image components are viewed through a multiple path optical system that simultaneously projects the separate monochromatic record image components in precise superposition on a screen, each of the projected image components being illuminated with a different colored light. According to a feature of the invention the color record image components are positioned on the record film with a maximum deviation from a nominal positioning that is not greater than a deviation that would cause a visibly discernible misregistration of the color components when the monochromatic images are displayed in mutual superposition upon the screen of the viewer. According to another feature of the invention, lack of precision relative positioning of the monochromatic record image components on the record film is accommodated in the viewer by adjusting the optical paths of the viewer, either manually or automatically, until registration of the projected image components on the viewer screen causes no visibly discernible misregistration of the color components.

Still another feature of the present invention is the use of a buffer memory for storing either black-and-white or color outputs of a medical diagnostic scanning device to enable selection of either color images or black-and-white images for optical recording.

BRIEF DESCRIPTION OF THE DRAWINGS

FIG. 1 is a simplified showing of an overall camera and viewer system;

FIG. 3 illustrates relative positioning of record image components and viewing screen of a viewer;

FIGS. 6 and 7 illustrate physical layout of an exemplary viewer;

DETAILED DESCRIPTION OF THE INVENTION

General System

Figure 2:
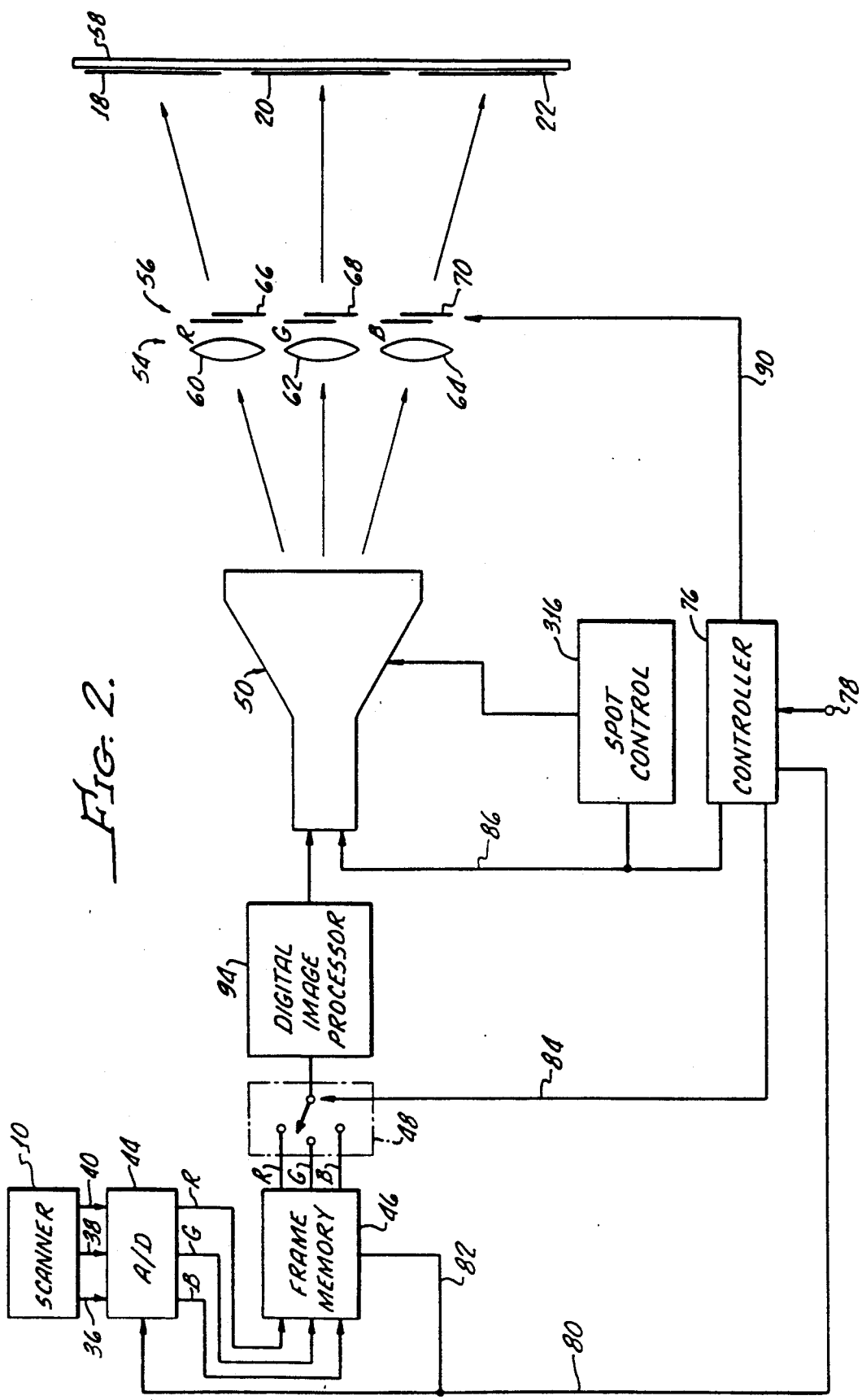
FIG. 2 is a functional block diagram of a camera employed to make a permanent color film record on monochromatic film.

FIG. 1 is a simplified illustration of components of a system employing principles of the present invention for making and viewing a color record for medical diagnostic purposes. A conventional scanner 10, such as an ultrasound scanning device, which may be an Acuson Model 128 made by Acuson, or an ATL Model Ultramark 9 made by Advanced Technology Laboratories, provides an output signal on lines generally indicated at 12 in the form of three separate color component signals of an image of a patient being scanned. Frequently the scanner output will, in addition, provide a sync signal together with the three color component signals. When the operator desires to record an image, the scanner output signals are fed to a camera or record forming device 14 which temporarily stores the signals from the scanner and sends the color component signals one at a time to a monochrome cathode ray tube (CRT) (not shown in FIG. 1) contained within the camera. The face of the CRT is sequentially exposed through a camera lens and shutter system arranged to form a separate monochromatic image on a sheet of film 16 of each of the individual color component signals. The camera is arranged to employ standard sheet film, such as a standard 8×10 inch black-and-white video image recording film sheet. In a presently preferred arrangement, such film will provide permanent records of two different color images. Each permanent record image comprises three separate monochromatic image components. Thus, for a first image, the film record includes monochromatic record image components 18,20 and 22, which, as a set, collectively define a first multi-color image. The same film sheet also may contain a second set of monochromatic record image components 24,26, and 28 collectively defining a second multi-color image. Thus, for example, on the film record 16, monochromatic or black-and-white image component 18 represents the red color component of a color image, monochromatic image 20 represents the green component of such color image and monochromatic image 22 represents the blue component of the color image. Similarly, monochromatic images 24, 26, and 28 represent red, green and blue image components of a second color image provided from the scanner. Accordingly, as illustrated, the standard sheet film has two sets of image components, with each set collectively defining a different color image.

The standard monochromatic sheet film 16, after exposure in camera 14, is processed in a conventional manner to provide permanent transparent monochromatic record images on standard black-and-white film, with three image components collectively defining one full color image. The developed record film 16 is then inserted in a viewer 30, which is provided with three separate optical paths having light of different spectral content transmitted along each path. The three optical paths converge on a viewer screen and each passes through a different one of the transparent monochromatic record image components 18, 20 and 22, for example. Individually colored converging light beams passing through the transparent monochromatic record image components 18, 20 and 22 are positioned by the lens system of the viewer so that all three projected images are superimposed on the viewer screen with a misregistration between any two of the projected images that is not greater than the amount that would cause such misregistration to be visible to the viewer in the form of color fringes or the like.

The system may be employed with a standard silver halide based photographic film system and thus use conventional black-and-white recording film, of the kind that is currently used to make gray scale diagnostic images. The camera can record either color (multiple monochromatic color image components) or conventional black-and-white images. Thus, the system exhibits a number of advantages, some of which are described in the following paragraphs.

Either color or black-and-white images may be recorded on conventional black-and-white film by the same camera. Separate cameras are not needed for black-and-white and color imaging. Physical size and power consumption allow the described camera to fit in space allocated in an ultrasound cart for current black-and-white cameras.

Film can be processed in conventional black-and-white film processors which are already present in most radiology departments. There are no special processing requirements, and film can be available for viewing in one to two minutes after exposure.

Image quality of both color images and black-and-white images is as good as that of current black-and-white images produced by conventional cameras because the film is the same. Gray-scale range and spatial resolution are just as good for the color images of the present system as that which radiologists are accustomed to in current black-and-white film images. Further, any image quality improvement that may be made in black-and-white film systems will enhance the quality of the color images as well.

The recorded black-and-white film images of color components have archival permanence which is the same as that of current black-and-white film. Filing and storage of such film can be integrated into the same systems as used for current black-and-white film. The use of the current common black-and-white film is economical because it is so widely used at present. The economy of this film is inherent in its structure, which consists of a single emulsion layer coated on a single substrate, unlike color media which require multiple layers, complex chemical compositions, complicated and critical processing and/or auxiliary materials to produce the colors. No current system for producing color images for diagnostic imaging applications has all of these advantages.

As will be described below, the present system can also be used with non-silver films, such as in systems which use electrophotographic, thermographic or the Polaroid Helios imaging techniques. In such arrangements corresponding advantages will apply because the techniques employed for the system illustrated in FIG. 1 will be used for recording of black-and-white or color images.

Camera

FIG. 2 shows a block diagram of components of the camera 14 of FIG. 1. Also illustrated in FIG. 2 is a conventional scanner, such as an ultrasound scanner that provides inputs to the camera. Conventional scanner 10 provides outputs on lines 36,38 and 40 in analog form representing color components red, green and blue, for example, of an image processed by the scanner. These signals, together with a sync signal (not shown) which may also be provided by the scanner, are fed to an analog-to-digital convertor 44, which may be part of the camera, that provides digitized versions of the red, green and blue signals to a frame memory 46 of the camera. One frame of each of the red, green and blue color components is stored in the frame memory. The individual color components (R, G and B) are fed from the memory 46 to a multiplexer 48 which sequentially feeds the digitized color components to the Z axis control of a cathode ray tube 50, which may be, for example, a standard monochrome high resolution, flat face, seven-inch CRT, such as the Clinton CE678M7P45. The display on the face of the cathode ray tube 50 is fed through two sets of lenses, generally indicated at 54 (there being three lenses in each set), with each lens being controlled by an individual shutter, generally indicated at 56. Each lens is arranged to project the image from the entire face of the CRT to a different predetermined area on the conventional monochrome film sheet 58. For any one image, three lenses, such as lenses 60, 62 and 64, are provided, each having its own individually controlled shutter 66, 68 and 70, respectively. The lenses are arranged in an off axis configuration so that lens 60, for example, will transmit the red color component to image component area 18 on the film sheet 58, with the lens 62 transmitting the green component, for example, to the image area 20, and the lens 64 transmitting the blue component to the image area 22 on the film. The camera employs no color filters.

A controller 76 is provided that may be initiated by an operator's command provided at a terminal 78. The controller includes an appropriately programmed microprocessor that provides control signals for the various components of the system, including a synchronizing signal on a line 80 to the analog to digital converter, a signal on a line 82 to the frame memory for extraction of information from the memory, a signal on a line 84 for control of the multiplexer, a blanking control signal on line 86 to the CRT for control of Z axis blanking, and shutter control signals on six lines collectively indicated at 90 for selective individual operation of the several shutters. It will be understood that where the system is arranged to provide recording of two separate images, as illustrated in the film 16 of FIG. 1, six separate lenses and six separate shutters are provided in the camera. Thus the set of three lenses 60, 62 and 64 is duplicated by second set of three lenses (see FIG. 4 or 5), with each lens of such additional set also having its own shutter.

If deemed necessary or desirable, an image processor 94 may be interposed between the output of the multiplexer and the input of the cathode ray tube to improve image quality. For example, a processor may perform a gamma correction for transfer characteristic distortion to correct the image to yield a linear overall curve of film density versus input signal variation, canceling the nonlinear effects of the transfer characteristics of the CRT and the film. Alternatively, a predetermined nonlinear overall transfer characteristic can be generated to spread out the density shades in a particular portion of the density range in order to facilitate diagnostic interpretation of the final image.

In general, for operation in color mode the multiplexer, the CRT unblanking, and the lens shutters are synchronously gated by the controller to produce three monochromatic record images for each of two different color images on the black-and-white film. In black-and-white mode of the camera, a single one of the color components is selected, the multiplexer is fixed on the selected channel, (the green channel for example) and CRT unblanking and the shutters are controlled to produce six different complete monochromatic images on the black-and-white film.

The optical arrangement shown in FIG. 2 is one of several which can be used to distribute images from the CRT to the film. For example, the six separate lenses used in the camera of FIG. 2 can be replaced by a pair of lenses corresponding to lens 60, for example, which pair is moved to three different positions, namely the positions corresponding to each of the lenses 60, 62 and 64 individually, by means of a linear translation mechanism. Alternatively, a single lens can be moved to six different positions by two linear translation mechanisms in an X,Y configuration. Still another alternative is to use two stationary lenses and move the film in its cassette to three different positions for the exposure. Still further, some combination of lens motion and film motion can be employed to produce six separate images on the single sheet of film.

The lenses are employed in an off axis configuration which is illustrated in FIG. 3, together with the six image components and the viewer screen. Thus a first vertically spaced set of lenses, lenses 60, 62 and 64, is shown in FIG. 3 horizontally adjacent a second vertically spaced set of identical lenses 60a, 62a and 64a, all of which are precisely and fixedly positioned relative to the camera and relative to one another. The lenses form six image components illustrated as image components 18, 20 and 22 in FIG. 3 for the lenses 60, 62 and 64, respectively, and as image components 18a, 20a and 22a for lenses 60a, 62a and 64a, respectively. The images 18, 20, 22 and 18a, 20a and 22a are positioned on a standard 8×10 inch black-and-white film, indicated in FIG. 3 by the dotted lines 100. Also illustrated in FIG. 3 is the position of a screen 102 of the viewer 30, as will be more particularly described below. Thus, effectively, the six lenses and six image components are symmetrically located in off axis positions relative to the axis of the cathode ray tube. In a typical example for use with an 8×10 inch film, each of the film images 18, 20, 22 has a dimension of 90×67.5 millimeters with a vertical center to center displacement of 79 millimeters and a horizontal center to center displacement of 97 millimeters. Each lens of the upper and lower pairs of lenses 60, 60a, and 64, 64a is displaced vertically from the inner pair of lenses 62, 62a by the same 44.011 millimeters, and the two sets of lenses, such as lens 64 and 64a, are displaced horizontally by 27.020 millimeters on either side of a vertical center line of the film.

In the exemplary embodiment illustrated in FIG. 2, analog video signals in the commonly designated RGB format representing color images from the diagnostic imaging host equipment, namely scanner 10, are fed into the analog-to-digital converter of the camera. The video signals come in on the three lines 36,38,40, each containing information of one primary color component of the color image. The signal in each color channel can be considered to contain a gray scale signal representing luminance variations of the corresponding color component.

At the initiate command the converter digitizes the next frame of the picture (all three color components) and places all frame components in the frame memory 46. A typical amplitude quantization of each color pixel is 8 bits per color, resulting in 256 shades for each primary color and requiring a total of 24 bits for each pixel in the memory.

The frame memory can also be used to insert black borders around the image components to appear on the film. This is desirable so that light does not shine through the borders when the images are viewed. To this end, if deemed necessary or desirable, the frame memory 46 may be made somewhat larger than the image components, and pixels outside of the image area are set to black or super-black level. Further, for purposes to be described below, the signals fed to the monitor are inverted so that light and dark portions are interchanged. The entire digitization of a single video frame must take place in real time, which requires 33.4 milliseconds for one frame interval of RS-170 video signals. Digitization of each horizontal scan line must take place in 52.5 microseconds, which is the interval for a single active line. However, after the image has been captured in the frame memory the remainder of the process in the camera can proceed at a slower pace.

After frame capture, one color component at a time is selected by the multiplexer from the frame memory and sent to the signal processor 94 from which serial image information is transmitted to the Z axis control of the CRT one horizontal line at a time, where it is scanned onto the face of the black-and-white cathode ray tube. The scan rate can be relatively slow, since the scan is not visually observed. For example, one single scan per second for each color component can be employed. In use of a slow scan technique, spaces between adjacent horizontal lines can be filled in by repeating the same line several times at a rate which overlaps them on the CRT or by generating new intermediate lines which are interpolated by the signal processor and sent to the monitor and inserted in their proper places in the signal stream.

The steps in the recording process, as controlled by the controller microprocessor, are as follows: Following an initiate command a single video frame is digitized and all three components captured in the frame memory as described above. The shutter behind the lens corresponding to the position on the film for the first image component, which may be red for example, is opened. A suitable delay of 100 milliseconds, for example, is provided to allow mechanical vibration of the shutter to cease. Then the multiplexer is operated to select the red component from the frame memory and transmit this component to the CRT via the signal processor. The CRT is unblanked (it had been previously blanked at initiation of the process), and the single frame, single component signal is fed to the Z axis control of the monitor one line at a time to be scanned horizontally across the face of the CRT. The CRT is blanked again. Thereafter the "red" shutter closes completing exposure of the red image component on the film. The "green" shutter opens simultaneously, with a similar delay to allow for damping of shutter vibration. The multiplexer is then operated to select the green frame component from the frame memory to feed this through the processor to the CRT. The latter is then unblanked to allow the green image component to be scanned on the face of the CRT one horizontal line at a time, after which the CRT is again blanked. The second or green shutter then closes to complete green image component exposure. Simultaneously the third or "blue" shutter opens, followed by a suitable delay for damping. The multiplexer now transmits the blue component from the frame memory to the CRT, which is then unblanked so as to cause the signal to scan across the monitor face one line at a time, after which the CRT is again blanked and the blue shutter closes, completing blue image component exposure. All three image components have now been exposed at three mutually separate locations on the film.

During the open period of each shutter the particular one of the six image areas of the film is exposed to the entire face of the cathode ray tube. The time of the CRT unblanking controls the exposure time. By varying the scan rate, both horizontally and vertically, exposure time may be changed. Different exposure times for the different colors may be employed.

If deemed necessary or desirable, CRT brightness drift may be cancelled by use of a luminance test pattern sensed by a calibrated light sensor in the camera in accordance with well known procedures. Exposure time or brightness may then be adjusted to compensate for brightness variation. Exposure time in the case of the described camera can be readily controlled by changing the rate of a single scan.

For operation of the camera in a black-and-white mode instead of the color mode the camera will record one image for each full record to be made instead of recording three image components, as in the color image as described above. Preferably, as mentioned above, the black-and-white video image will be provided on the green channel, and the multiplexer fixed to that channel. Single images from the CRT are distributed to the film by opening one shutter for each image. The shutter opened is that which is behind the lens corresponding to the position of the film reserved for the images in sequence. Thus, six different black-and-white images may be recorded in six different positions on the film.

If the scanner 10 should provide a digital rather than an analog output of three video signal color components, the analog to digital converter 44 may be omitted.

The described camera, in another embodiment, may employ no internal digital video, but will accept analog video in three channel RGB format (or some other format converted to RGB format). Such a multi-component analog video signal will be sent by this analog camera one component at a time directly to the CRT Z axis control, with the CRT operating at the input scan rate and not in the slow scan mode that is employed in the digital camera described above and illustrated in FIG. 2. The camera which accepts the analog signals directly needs no frame memory and no signal processor. Stored analog video frames can be provided from the internal frame memory of the host ultrasound scanner. Such an analog camera is simpler but lacks the digital capability that can improve images and yield better pictures.

The camera system described above, is arranged to be directly connected to the host diagnostic imaging scanner. It will be readily understood, however, that the output of the diagnostic scanner may be recorded on suitable intermediate storage media such as disc or tape. Such disc or tape is then transported to the camera for playback and recording on the 8×10 inch permanent film record. In such a configuration a suitable acquisition or image storage unit at the diagnostic scanning machine is arranged to record the selected electronic images so that several of such diagnostic scanners may share a single camera. At the camera location a single playback unit is provided to play back the intermediate storage disc or tape and thereby furnish the electrical input for the camera in place of the signals such as those provided from scanner 10. Except for the fact that the operation takes place in two parts, the first part being at the acquisition unit where the image is recorded, and the second at camera film recording time, the operating sequence is the same as that previously described.

The camera described herein employs a cathode ray tube having an image on its face that is photographed on the film. Other types of cameras producing film images by other means may also be employed. In fact, any technique that produces accurately sized images in precisely placed positions on a transparent medium can be used. For example, in a so-called laser camera, an intensity modulated narrow laser beam is scanned back and forth over the width of a sheet film as the film is moved. In such an arrangement, because the scan must cover the entire width of the film, it is not practical to generate one small image at time in different places, as is performed with the CRT based camera. Instead an electronic representation of the entire set of images to be placed on the film, including separate images in various places, is assembled in a larger memory and serially sent from that memory to the scanning mechanism to generate the exposure of the entire film.

Still another kind of camera employs an electrophotographic process. In such an arrangement a sheet of film coated with a previously charged transparent photoconductor is caused to pass by a fiber optic CRT face in very close proximity. The CRT is scanned with a moving raster onto the photoconductor film as the latter passes, selectively discharging the photoconductor. Movement of the film is synchronized with movement of the raster, which is only a few lines high in such an arrangement. Thus, in this arrangement the CRT provides the X scan and the moving film provides the Y scan. After the film passes the CRT, it passes toning and fusing stations similar to those in a xerographic photocopier and then emerges with an appropriate record image on it. As in the laser camera, the entire image to be put on the film is first assembled in a larger memory. In both this arrangement and the laser camera the resulting permanent film record comprises three sets of individual record image components.

Another example of alternate recording techniques that may be employed for forming permanent multiple color image component records is the Polaroid Helios technology, which employs a layer of carbon pigmented imaging material sandwiched between a substrate and cover film. The imaging material is exposed by intensity-modulated laser beams which are scanned over the imaging area. After exposure, the cover sheet is peeled off. Where there is to be a dark part of the image, the pigmented material adheres to the substrate; where there is to be a transparent part of the image, the pigmented material comes off with the cover sheet, which is discarded. The process is a binary one, yielding ares of either high light transmission or low light transmission. To achieve intermediate shades of gray, a sub-pixel micro-dot technique is used, varying the number of dots per unit area. As in the previously described laser/photographic camera, to produce multiple images in various places on the film, the entire film image is first assembled and formatted in an electronic memory and then the film is exposed all at once, not image by image.

Figure 4:
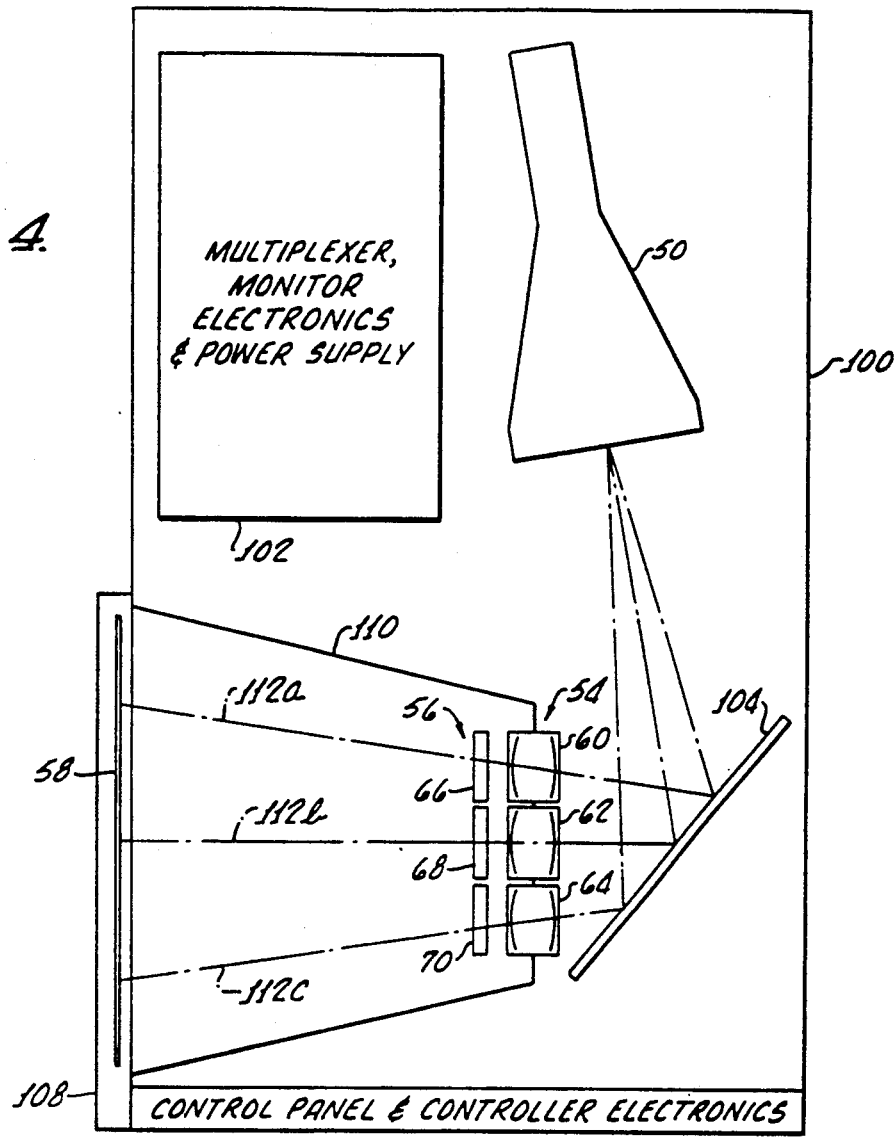
FIGS. 4 and 5 illustrate physical layout of an exemplary camera.
Figure 5:
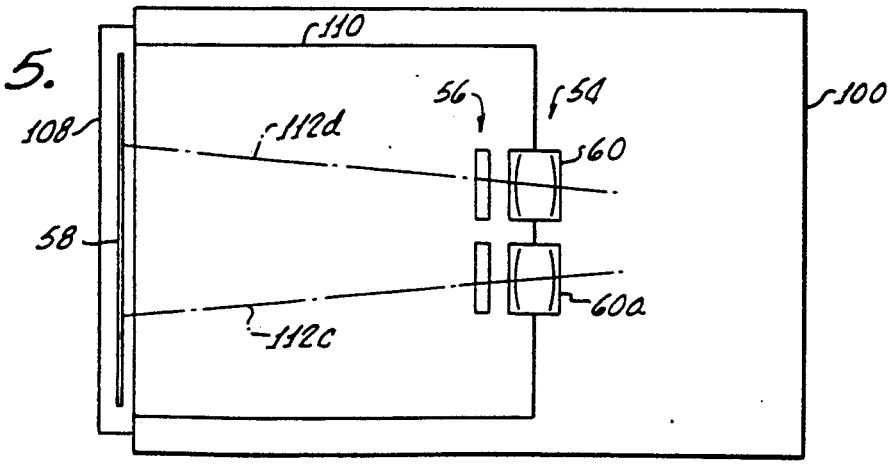

FIGS. 4 and 5 are simplified illustrations of mechanical configurations of the camera illustrated in FIG. 2. Thus, a camera housing 100 mounts the cathode ray tube 50 adjacent an electronics housing 102 containing analog to digital converter, multiplexer, monitor electronics and power supply. The image of the face of the cathode ray tube is transmitted to a mirror 104 fixedly mounted in the housing which reflects the light from the cathode ray tube face through the lens set 54 and the shutter set 56. Each shutter is positioned directly behind a respective one of the lenses. Camera housing 100 contains a film cassette 108 which detachably mounts the standard 8×10 inch film sheet 58. A light tight inner housing or enclosure 110 seals the area between the lens and shutter sets and the film cassette against entry of ambient light. The lenses may have a 135 millimeter focal length with an aperture of F/16. With the monitor adjusted so that the CRT luminesce is 1.3 foot lamberts at the video white level and 20 foot lamberts at the video black level, exposure time to properly expose conventional medical video recording film will be approximately one second for each color separation record. This exposure time may be obtained by employing a scan rate of one frame per second.

In FIGS. 4 and 5 the dotted lines 112a,112b, 112c,112d,112e and 112f respectively represent the center lines of optical paths of the six separate images.

Viewer

FIGS. 6 and 7 illustrate respectively side and front vertical views of an exemplary embodiment of a viewer for use with multi-monochromatic image component records produced by the camera described above. In this configuration the image record, namely the standard sheet film that has been produced in the camera, is placed in the focal plane of a six channel optical projection system where it is illuminated from below by a multiple light source of the condenser type. Thus, in the illustrated exemplary embodiment, the viewer includes a generally upright viewer housing 116 having a transverse frame 118 extending across an intermediate portion of the housing for supporting six condenser lenses of which those identified by numerals 120,122 and 124 are shown in FIG. 6.

Also mounted on the intermediate transverse frame 119 and guided by side guides 121 is a slidably extendable film drawer 128 in which is mounted the film 58.

A second transverse support 130 is fixedly mounted to and within the viewer housing above the film holder and carries a trio of fixed projection lenses 132,134,136 and a second trio of projection lenses 132a,134a,136a. These projection lenses (and the dual trios of condenser lenses) are arranged in the same off axis configuration as are the lenses in the camera, so that the film images are projected to a rear projection screen 140, mounted in the wall of housing 116, via a reflecting mirror 142 that is also mounted in the viewer housing. The arrangement is such that the projected images of each of the three image components of one set are precisely superimposed and of the same size as the original cathode ray tube display.

At the bottom of the housing 116 are mounted six separate light sources 144,144a,146,146a,148,148a, of which one is provided for each projection lens and its associated condenser lens. Each light source employs a lamp of the MR-16 type, having an integral ellipsoidal reflector of about two inches in diameter. A lamp of this type has its filament positioned at one focal point of the ellipsoid so that an image of the filament is projected out in front of the lamp, with this filament image being the object of the condenser lens 120 through 124a in each of the six projection channels. Each condenser lens relays that filament image through the film and into the aperture of the projection lens of its own individual channel, thus directing light from the source through the transparent film image component to an individual one of the projection lenses.

Red, green and blue color filters are provided in respective ones of the several viewer channels or light paths. In one embodiment these filters may be incorporated into and made a part of the individual projection lens. A series of baffle plates, such as plates 150a,150b, etc., are mounted on fixed baffle plate supports 160 and 162 and provided with six sets of aligned apertures of decreasing size. The apertures of each set taper from a relatively large aperture 164 for a lowermost plate 150n to a smallest aperture 166 at an uppermost one of the plates 150a. The six rectangular apertures of graduating size in each of the baffle plates effectively form six light directing tubes or tunnels for the six image paths from the six light sources to the six projection lenses. Only one set of three lamps (for illuminating the three components of one image) is turned on to view one image. Accordingly, each of the three individual projection lenses of one set will receive light from one entire image component but will not receive light from any of the other two image components of the illuminated set. Thus, stray light is prevented from contaminating individual images and degrading image quality and contrast.

Each of the six lamps may be run at 100 watts so that during projection of all three component images of one record the viewer will use 300 watts. Each condenser lens has a focal length of 120 millimeters and is of aspheric shape to reduce its spherical aberration, which would otherwise cause uneven illumination of the image. The condenser lenses are cut into a rectangular shape instead of a round shape so each one can be centered behind its film image and fully cover the entire image without physical interference with an adjacent condenser lens. The condenser lenses are mounted very close to the film so that the film images are fully illuminated all the way to their corners.

The projection lenses have a focal length of 150 millimeters and an aperture of F/6.5. Color filters for each of the six channels are mounted on each of the individual lenses so that light projected in each channel has a different spectral content. The filters may be of the glass sandwich type, having a spectral characteristic equivalent to Kodak Wratten types 29 red, 61 green and 47 blue. Of course other types and locations of the color filters, with other spectral characteristics, may be employed to provide the required light of different spectral content for each of the six separate optical paths.

In operation of the viewer, with a film in the drawer and the drawer in position, one of the two color images recorded on the film (in the format illustrated in FIG. 1) is chosen for viewing by turning on the three light sources which represent the components of the chosen image. The other three light sources are turned off. To view the second color image on the sheet film, of course, the first three light sources are turned off and the second three turned on. On the projection screen 140 the three individual primary color image components of the single composite record are superposed in precise registration and precisely equal size to present a full color composite image.

Figure 10:
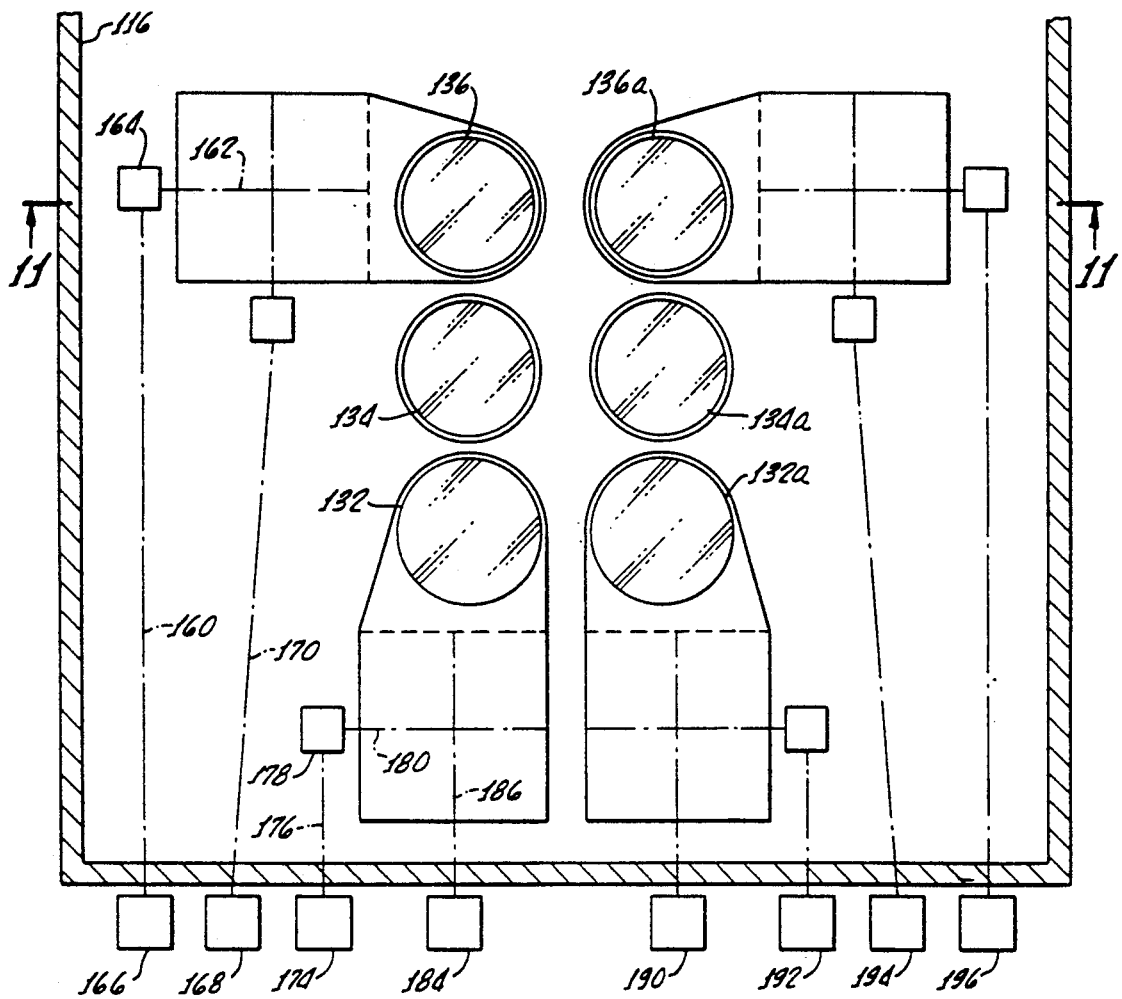
FIGS. 10 and 11 schematically illustrate manual lens adjustment of the viewer.
Figure 11:
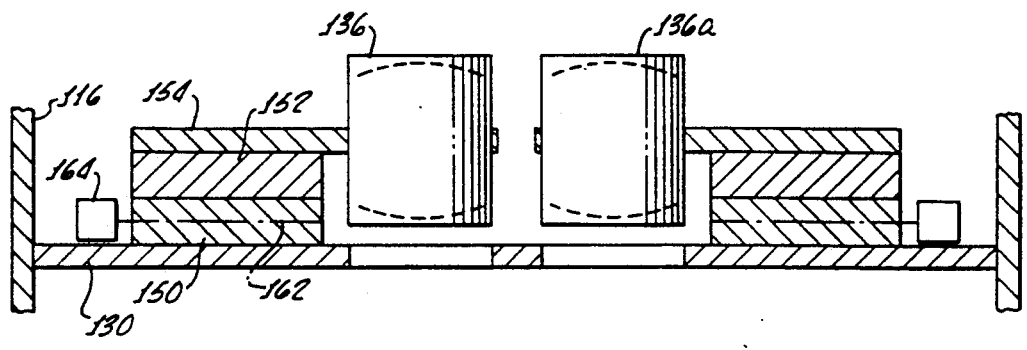

In order to ensure precision registration on the viewer screen of all projected images of one set of image components so that no misregistration is visibly discernable to a person viewing the display screen 140, each group of three projection lenses employs a fixed center lens, such as green lens 134, and a pair of adjacent adjustable lenses, such as red and blue lenses 136 and 132. Each of the adjustable lenses is mounted for adjustment in two mutually orthogonal directions in a plane perpendicular to the lens axis. Thus, as illustrated in FIG. 10, lens mounting plate 130 carries a horizontally adjustable horizontal support 150 upon which is slidably mounted a "vertically" adjustable vertical support 152, which itself carries a fixed lens mount 154 that fixedly carries lens 136. Because of the angled mirror in the optical path of this vertically oriented viewer, X,Y adjustment of the lenses (in a horizontal plane perpendicular to the lens axes) results in horizontal and vertical movements respectively of the blue and red primary color images on the vertically oriented viewer screen.

Adjustable support 150 for lens 136 is adjustably operated by a rotary control shaft 160 (see FIG. 10) which drives a screw 162 threaded to a nut (not shown) carried by the horizontal support 150. A right angle drive 164 interconnects the screw 162 and rotary control shaft 160. The latter is rotated by a horizontal control knob 166 mounted on the outside of the viewer housing 116. A vertical control knob 168 also mounted on the outside of housing 116 operates a rotary control screw 170 which is threadedly engaged with a nut (not shown) connected to vertical lens mount 152.

Similarly, lens 132 has horizontal and vertical adjustable supports that are respectively operated by a red control knob 174 via a rotary control shaft 176, a right angle drive 178 and a threaded shaft 180 for horizontal control of lens 132. A vertical red control knob 184 operates a screw 186 threadedly connected to adjustably position the vertical lens support of blue lens 132.

In a like manner, for the second image, which is projected by the second triad of lenses 132a,134a and 136a, there are provided vertical and horizontal red control knobs 190,192 and vertical and horizontal blue control knobs 194,196 that are actuated by mechanisms, identical to those previously described, for X,Y (horizontal and vertical) adjustment of lenses 132a and 136a of the first image projection system. Preferably the adjusting screws have a very fine pitch to provide for small amounts of precision adjustment. By means of these adjustments the three image color components on the projection screen can be brought into exact mutual registration by moving the red image component to precisely overlay the green image component and also moving the blue image component to precisely overlay the green image component.

The red and blue lenses of each triad of lenses may also be mounted to their respective movable supports so that they can be moved in the Z direction or axially of the lenses, but only as an internal or factory adjustment. When the viewer is assembled during manufacture, magnifications in the three channels thus can be matched by moving the lenses axially one at a time so that the size of the red image is matched to the size of the green image, and the size of the blue image is likewise matched to the size of the green image. Precise matching of projected image component sizes is also critical for avoiding visibly discernable misregistration.

Figure 8:
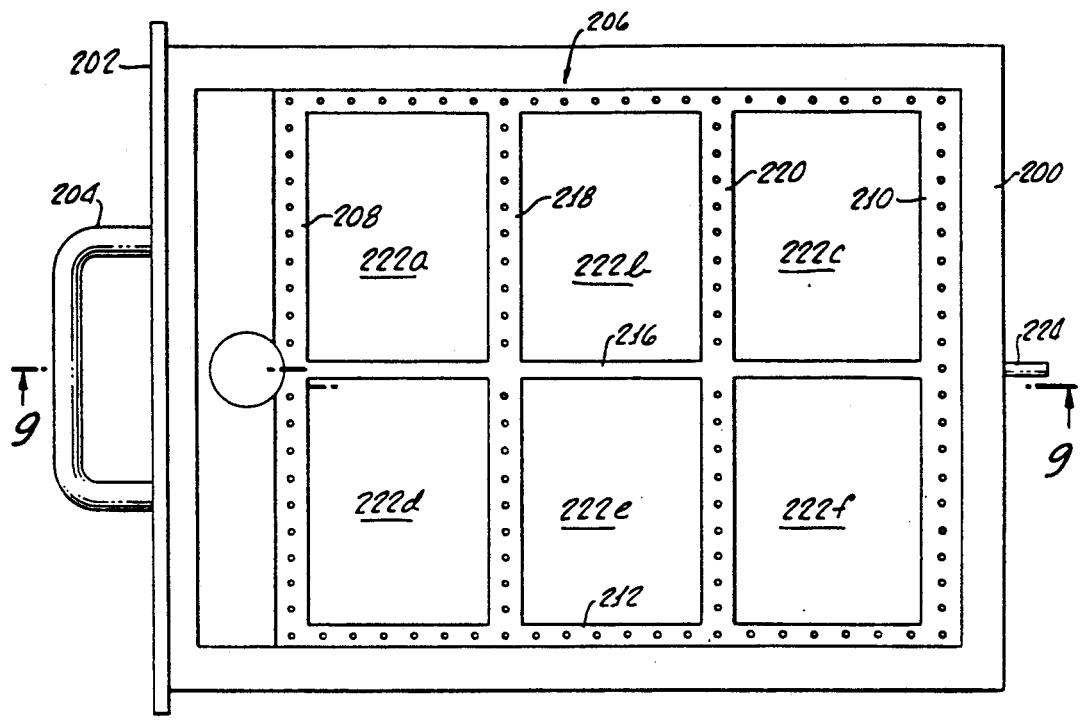
FIGS. 8 and 9 show different views of a film holder drawer of the viewer.
Figure 9:
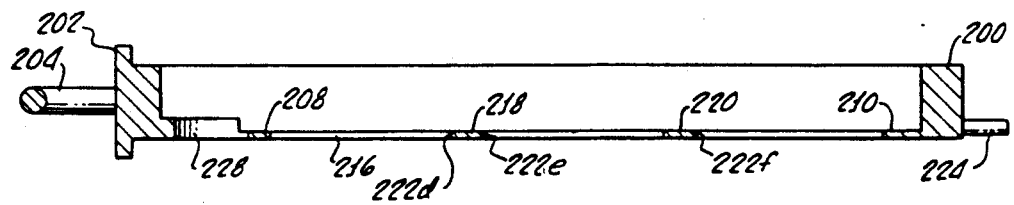

Illustrated in FIGS. 8 and 9 are details of the drawer 128 that is slidably and removably carried by the viewer housing and which is arranged to mount a sheet of film bearing color image components. The drawer comprises a rigid rectangular frame 200, having a drawer front 202 and a handle 204 which is grasped to slide the drawer in and out of the viewer on support 118 and lateral drawer guides 121. Fixedly mounted to and within the exterior frame 200 is a skeletal film holder 206 having front and rear members 208,210 interconnected with side members 212 and 214. A longitudinal support member 216 extends between the front and rear members 208 along the center line of the frame 206. Transverse members 218,220 extend between side members 212 and 214, with all of the members rigidly interconnected to one another and symmetrically disposed as illustrated to provide six separate viewing apertures 222a through 222f. Each of the film image areas 222a through 222f has a size slightly greater than the size of any one of the equal size image components of the film sheet, including a border of the image component, if any. The film holder 206 is perfectly planar and provides a rigid flat support for the film sheet. Suitable means are provided to hold the film sheet precisely flat and directly against the support so that all of the color image components of the film sheet will be at precisely the same distance from the respective projection lenses.

For the purpose of holding the film against the film holder by ambient air pressure, a vacuum fitting 224 is provided on the inner end 200 of the slidable film drawer for connection to a source of vacuum (not shown). Vacuum fitting 224 is connected with a manifold or set of conduits that extend to and through the film holder members 208, 210, 212, 214, 218 and 220. Upper portions of all of these members are provided with vacuum apertures, such as apertures 226, so that when a sheet of film is placed on the holder 206 and a vacuum is drawn through fitting 224 and all of the vacuum apertures, all six image areas of the film are held perfectly flat, in the same plane, against the film holder and thus are held equidistant from the projection lenses. The frame of the drawer may be provided with a finger aperture 228 to facilitate release of the film from the holder.

The film record is placed onto the film holder 206 of the drawer, which is then closed. The drawer is slidably moved into the viewer on the precision slides 121 which position the drawer accurately when closed so that the film is precisely and repeatably positioned in the focal plane of the optical system. The bottom of the drawer where the film rests is very thin, in the order of 0.080 inches so that the film can be positioned close to the condenser lenses. The six rectangular image component areas of the film holder permit the light to shine through the image components of the film. Each area is made slightly larger than the image size on the film to allow for slight mispositioning of the film. Fitting 224 of the drawer connects with a flexible hose (not shown) which is connected to a vacuum source. A switch 223 (FIG. 6) is mounted to the viewer frame for actuation by the back of the film drawer when the latter is closed. The switch, when operated by the closed drawer, actuates a valve that initiates application of vacuum to the fitting 224 so as to draw the film down to ensure that it is flat and that all images are in focus. With all images in the same focal plane, all projected and superposed images have the same magnifications (and size on the screen) and a precision registration of all projected superposed image components on the viewer screen is better assured. When the drawer is withdrawn, the vacuum controlling valve is operated to vent the vacuum system to atmosphere to facilitate removal of the film.

Other arrangements for holding the film flat and with all parts at precisely the same distance from the lenses may be employed. For example, instead of the skeletal frame 206, the drawer may be provided with a flat glass bottom and a second glass plate hinged to the flat glass bottom so that the film may be effectively sandwiched between a pair of glass plates. However, the described vacuum system is preferred since it does not require manipulation nor the care and cleaning of the glass that may be required to ensure clarity of transmission of light through the glass.

If deemed necessary or desirable, the same switch that actuates the vacuum valve may also be connected to operate the power supply for the lamps in the light source of the viewer, whereby the lamps are energized only when the drawer is closed and the film is in position for viewing.

Various alternative arrangements of a viewer for projecting three mutually superposed images may be employed. For economy of optics, the viewer may employ three projection lenses instead of six (for a film with two pairs of triads of color image components). The three lenses, arranged in a vertical set, may be mounted as a unit to be mechanically moved from side to side so as to project either the three color image components of the first color image or of the second color image. All lamps may be on at all times or the lens unit motion can be constructed and arranged to actuate switches that turn on an appropriate group of three lamps for illuminating the image selected for viewing.

As still another alternate arrangement, three projection lenses and three light sources can remain stationary and the film in its drawer can be moved from side to side to project either one or the other of the three component color images.

With appropriate alteration of directions of the image paths, the viewer can be constructed and arranged to project both color images simultaneously in a side by side arrangement on a wider projection screen with six lamps on all at one time.

In the described viewer arrangement the color filters are mounted directly on the projection lenses. However, the filters may be placed anywhere in the light paths, either inside the lens assemblies, or at or near nodal points which can decrease size and expense. The filters can also be part of the light source, positioned at or near the concentration of light flux so that the filters can be of decreased size.

As another option, instead of using six individual wide spectrum light sources and selective filters to eliminate certain portions of the color spectrum so as to yield the desired primary colors, the light sources may themselves be colored, as, for example, by use of multiple different color light emitting diodes or lasers.

Registration of Projected Image Components

In the description of the camera and viewer above, reference has been made to precision of positioning of the record images and to the precision of the mutual registration and superposition of projected images in the viewer. Precise positioning of all three superposed color image components on the viewing screen is necessary to avoid discernable misregistration. Human observers can easily see color fringes at the edges of superposed images. Normal human eyes, at a viewing distance of about ten inches, which is the closest that most normal eyes can comfortably focus, will discern misregistration between two primary color images on a viewing screen where the misregistration is more than about 0.006 inches. Such discernable misregistration or color fringing may not appear to be objectionable if the misregistration is 0.02 inches or less. The color fringing is significant since it will adversely affect recognition of alphanumeric characters which are part of medical ultrasound pictures and which display date, examination site, patient identification, etc. Further, in the clinical image areas of the picture, color fringing may also adversely affect interpretation of images. Thus, it is of critical importance that the images on the screen of the viewer be so closely registered with one another as to avoid discernable misregistration. A goal of a maximum misregistration of superposed images on the viewer screen of not more than 0.02 inches can be achieved in several ways.

In one way of achieving such final precision registration of the three images components, the image components on the film record must be precisely positioned with a predetermined relative positioning so that when the film sheet is placed in a viewer having a fixed predetermined relative positioning of its lenses, the images on the viewer screen are precisely registered with no discernable misregistration. This is accomplished by critical positioning of any two of the image components relative to the third. Alternatively, if the record image components are not positioned on the sheet film relative to one another with sufficient precision, the critical precision superposition and mutual registration of projected image components may be achieved by adjusting the lenses of the viewer. Thus, the viewer lens adjustments described above may be employed to compensate for erroneous relative positioning of the image components on the film record itself. To obtain sufficiently precise relative registration and precise superposition of all three color image components on the viewer screen it is only necessary to move each of any two of the projections of the image components into precision registration with the third. Further, as will be described below, an automatic registration (convergence) control may be employed in the viewer so that all three projected image components of a single color image will be automatically superposed in precision registration by automatic adjustment of two of the lenses of a triad. This automatic convergence control employs a film record having reference indicia formed in precision predetermined locations adjacent each image component.

For proper mutual registration of the viewed images, the overall system must account for both image component position and size. In a presently preferred embodiment of the viewer, magnification is 1.26× from the film to the screen. This means that position and size accuracy referred to the film must be within 0.0048 inches for the above mentioned 0.006 inch misregistration limit or must be 0.012 inches for the 0.020 inch misregistration. These maximum misregistrations are the maximum total relative positioning and size errors between any two of the three image components on the film record.

Both the camera and the viewer can be adjusted during manufacture so that the sizes of the three images match almost perfectly. Size adjustment is accomplished by adjustment of the axial positions of the lenses to alter the magnification. Absolute image size is of relatively lesser concern since it is only necessary to match the size of two of the image components to the third. Any defocusing caused by such slight axial adjustment in order to match magnifications will not result in any discernable image degradation. Accordingly, for all practical purposes, system errors due to image size variations between the three channels may be considered to be negligible.

Errors due to lateral image displacement, that is, errors in relative positioning, are of greater significance. Again it is not necessary to obtain absolute image positions, but only to obtain relative positions of two of the image components relative to the third.

Thus, if no adjustments are to be made in the viewer with respect to relative position of the projected images, it is necessary that the camera system for making the film record be constructed and arranged so that the image components exposed on the film sheet have a maximum deviation between any two of the triad of images of not more than about 0.0048 inches. Assuming that the viewer contributes no further registration errors, and further assuming that no adjustments are made in the viewer, this precision of image positioning of the image components on the film record is more than adequate to preserve the mutual registration required to prevent any discernable appearance of color fringing or other misregistration on the viewer screen, even to a very critical observer. However, even with such precision registration of relative position on the film record, it may still be desirable to ensure that the contribution of the viewer to any misregistration errors is substantially zero. Therefore, the viewer incorporates operator controlled convergence adjustments that enable X,Y motion of two of the image components relative to the third by translational motion of the lenses. Such adjustment allows any misregistration or misconvergence errors of the displayed superposed images to be nulled out. Once such an adjustment of the viewer is obtained, registration will be perfect or at least acceptable for all films produced by the camera which produced the film that is used for the user convergence adjustment of the viewer. The registration will be critically acceptable for films produced by any other camera which are within 0.0048 inches of misregistration. Furthermore, the convergence adjustments on the viewer serve the added purpose of providing an ability to properly display (without discernable misregistration) film produced by other cameras that may be abnormally out of register, including cameras built by manufacturers other than the one that builds the viewer itself.

Another problem that may affect registration accuracy is the shape of the image, that is, its deviation from perfect rectangularity. If the shape of the three image components of the color image are not the same they cannot be brought into register in all parts of the composite image. In the described system two factors affect image shape. One is any difference in the shape of the objects being photographed, that is the shape of successive displays on the CRT. Another is the effect of differential optical distortion of the images because optical systems in both the camera and the viewer are off axis.

With respect to the first factor, shape of the displayed image on the monitor need not be perfectly rectangular as long as it does not change between the recording of the three successive color image components. If it does not change during the recording of the three components, all the three distortions will match one another.

The second factor, differential optical distortion, is due to the fact that the three optical systems are off axis in different directions for the three images of each trio of images, as illustrated in FIG. 3. Even though the lenses themselves are rotationally symmetrical about their individual axes, these axes intersect the images at different points within each image so that any off axis optical distortion affects different parts of the three different images. However, the viewer and camera described herein are provided with optical systems in the viewer and camera that are reciprocally similar. Therefore, the effects of these distortions in the camera and the viewer cancel. Accordingly, even if the shapes of the individual images on the film do not quite match, they will match when projected on the viewer screen. In order to accomplish this matching, the magnification in the camera is the reciprocal of the viewer magnification. The recording lenses in the camera and the projecting lenses in the viewer are of similar optical design and face in opposite directions. They are of approximately the same focal length, and the optical dimensions of the camera and viewer are approximately reciprocally symmetrical. Thus to avoid this optical distortion in an exemplary system, viewer magnification is $1.26\times$ and camera magnification is $0.79\times$, the reciprocal of $1.26\times$.

The reciprocal symmetry between camera and viewer optics has another surprising and unexpected beneficial effect. This effect is correction of color shading due to differential illumination fall-off in the camera and viewer optical systems. All lenses except some very special ones exhibit a fall-off in image illumination as the field angle increases. In the camera described above employing a lens of 135 millimeter focal length, with off-axis lens and image positions as shown in FIG. 3, the illumination at the farthest corner of the image is approximately 73% of illumination on the lens axis. This causes a gradual change in film density in each image as one moves away from the lens axis. Since the three lens axes intercept the three film images in different places, as shown in FIG. 3, density change will be rotationally symmetrical around different points on the various color image component records. The densities of the three images control the amount of colored light projected on the viewer screen in each of the three color channels. Thus it may be expected that the primary colors would add together differently in different parts of the composite color image projected on the viewer screen, causing undesirable changes in hue in different parts of the field.

However, as previously mentioned, the silver-halide video recording film produces a positive image because the inversion of the Z-axis signal fed to the CRT causes the CRT to display a negative image. The positive film image is dark where it is exposed to light from the CRT and transparent where it receives no light. This inversion is achieved, as previously mentioned, by electrically inverting the video signal in the camera so that the "black" video level produces high brightness on the CRT to make the film image dark and the "white" video level produces low brightness on the CRT so that the film image will be transparent. The result is that the density of the film in each image is darkest on the lens axis and becomes lighter away from the lens axis (which is not the same as the image axis). In the viewer the same off-axis light fall-off phenomenon in the projection optics produces more light on the lens axis and brightness falls away toward less light as distance from the lens axis increases. Because the optical systems in the camera and viewer are reciprocally symmetrical (eg. the magnification of one is the reciprocal of the other), and particularly because the relationships between the lens axes and image axes are the same in the camera and the viewer, the asymmetrical illumination fall off effect of the camera and the corresponding effect of the viewer on the viewer screen image will be in opposite directions. The higher light flux on the projection lens axis is more attenuated by the darker density of the film on the lens axis. In actuality, the cancellation is not exact because of the effect of the film characteristic, but the effect is nevertheless sufficiently significant to make the color shading undiscernible.

Figure 17:
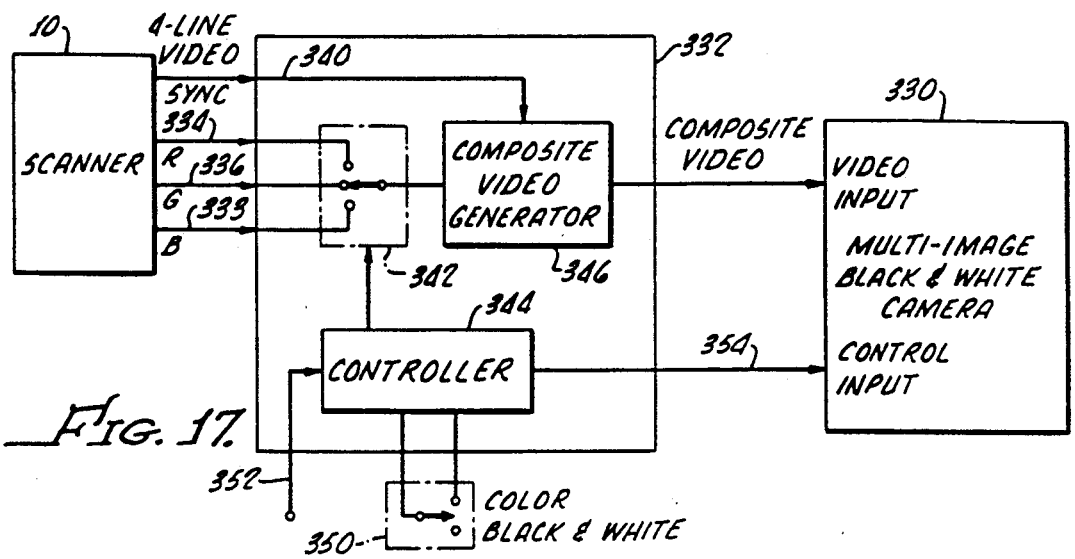
FIG. 17 illustrates a camera arrangement in which a conventional camera is provided with an adapter to form a color record on black-and-white film.

In the system arrangements described above, required accuracy of superposition of the separate projected primary color image components on a viewer screen is accomplished primarily in the recording process by precise location of the color separation image components on the film in the camera and by precise positioning of the images in the viewer. In these systems, adjustment of the viewer for minimizing misregistration is not necessary or need be performed but one time. This requires, primarily, a precision camera and use of the same camera or a camera with equivalent precision positioning to make records having precisely positioned image components for the viewer. However, for the film record produced by a camera having less than the desired precision of relative positioning of the color image component, the viewer lenses must be adjusted to properly register color image components on the screen. For example, described below and illustrated in FIG. 17 is an adapter that enables a conventional camera to form the sets of color image components of the system described above. Because such conventional camera may not produce film image components positioned with requisite precision, the viewer may be required to compensate for the lack of precision positioning. To this end the viewer may be provided with automatic convergence, as will be explained in the following description.

Automatic Convergence

An alternative approach to precise image positioning on the record as achieved by a precision camera, is to modify the viewer so as to automatically adjust its optical system so that the viewer automatically achieves good superposition of image components even though the image components may not be accurately positioned on the film. This approach is somewhat more complex but avoids the problem of requiring a film record made by a camera of very high precision and stability, and allows even previously designed black-and-white cameras to be adapted for use as components of the described system. Such adaptation of a conventional camera will be described hereinafter.

A viewer with automatic convergence will project components from a record in which the image components are not relatively positioned with sufficient precision, and will project them on the screen of the viewer with relative positioning having a maximum error that avoids discernible misregistration. In general, this automatic convergence control is accomplished by causing the camera to place a fiducial or reference mark on the film at a predetermined position with respect to each of the color image components. The viewer employs these fiducial marks as references and automatically adjusts viewer lenses to bring the projected images into precise superposition. If each of the fiducial marks on the film record have the same spatial relationship to each of the separate images with which the respective fiducial marks are associated, then when the projections of fiducial marks are brought into registration in the viewer, the associated images will also be in registration with each other, that is, they will be precisely superimposed. Portions of a viewer for accomplishing such automatic convergence control is illustrated in FIGS. 12 through 16.

Figure 12:
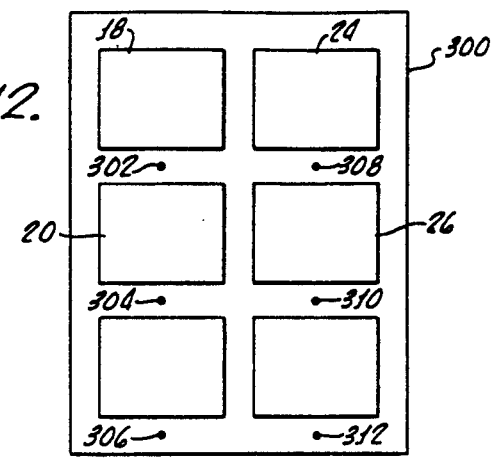
FIG. 12 illustrates a film record having color images and automatic convergence adjusting spots.

FIG. 12 illustrates a sheet film 300 substantially identical to the sheet film 16 of FIG. 1, having image components 18 through 28 just as described above in connection with FIG. 1. However, the camera is modified to provide, in addition to the color image components, fiducial spots such as spots 302, 304, 306, 308, 310 and 312, each having a predetermined position with respect to its associated image. Thus, spot 302 has a predetermined position with respect to its associated image 18. Spot 306 has a same predetermined position relative to its associated image 20, etc. The spots are made on the film close to each of the associated color image components by producing a light or dark spot on the face of the CRT at the same time that the pictorial raster of a particular image component is produced. The fiducial spot and the image component on the face of a CRT are exposed or photographed onto the film at the same time. The spot is positioned outside the raster image area but is within the field of view of the camera optics. Conveniently, the spot may be produced by the monitor, during vertical retrace interval, by briefly deflecting the cathode ray tube electron beam to the desired position of the spot and simultaneously unblanking the beam for a short time. This is performed by a simple and known modification of the CRT control electronics, which is schematically illustrated as a spot control circuitry 316 forming part of a controller 78 of FIG. 2.

A viewer modified for automatic convergence control includes a sensor and a set of filters for sequentially sensing position of the reference spots for a set of red, green, and blue image components and automatically moving the red and blue lenses so as to ensure precision superposition of all of the three sensed spots. This ensures precision registration of the three projected color component images. The optics of the viewer project the three fiducial spots together with the three image components of each set onto the common focal plane, which is the plane of the viewing screen. If the three separate color images on the screen are not in register, the three projected reference spots, which are projected in the same colors as each of the associated image components, will not be in register either. By automatically bringing the spots into mutual registration the pictorial image components are also brought into register.

Arrangement of the viewer for the automatic convergence control may be identical to that shown in FIGS. 6–11 except that automatic adjustment instead of manual adjustment of red and green lenses in X and Y is provided for both image sets.

In general, a sensor detects misregistration of the projected color reference spots and develops an error signal if the spots are not in register. This error signal is used to drive actuator motors that move the lenses in a sense to decrease the error signal so that the fiducial or reference spots are moved more closely into registration. Thus, a closed loop control is provided for the automatic convergence of projected images.

Figure 14:
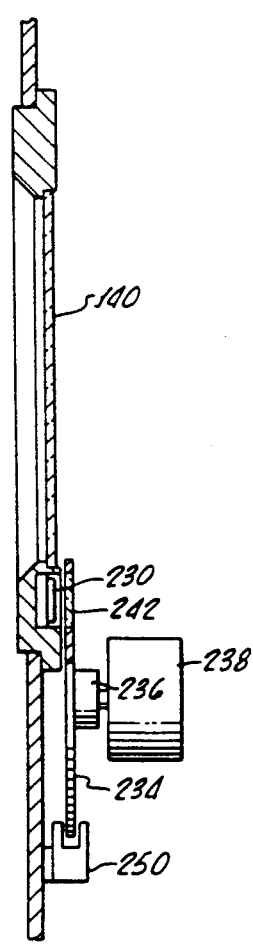
FIGS. 13 and 14 illustrate front and side views of the physical layout of portions of a viewer having automatic convergence adjustment.
Figure 13:
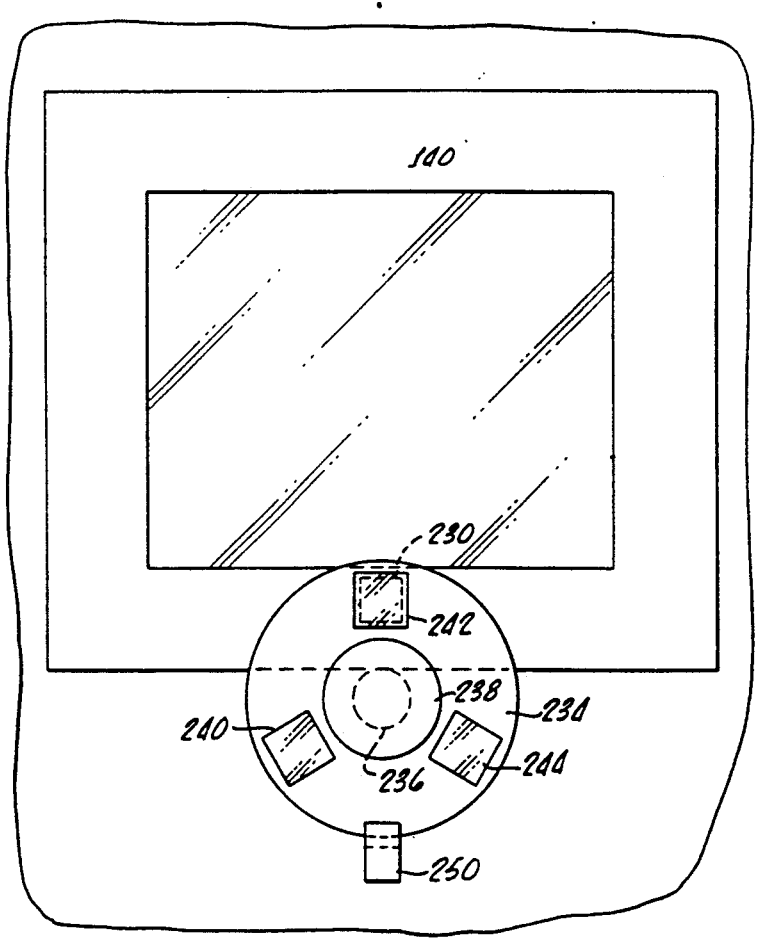
Figure 15:
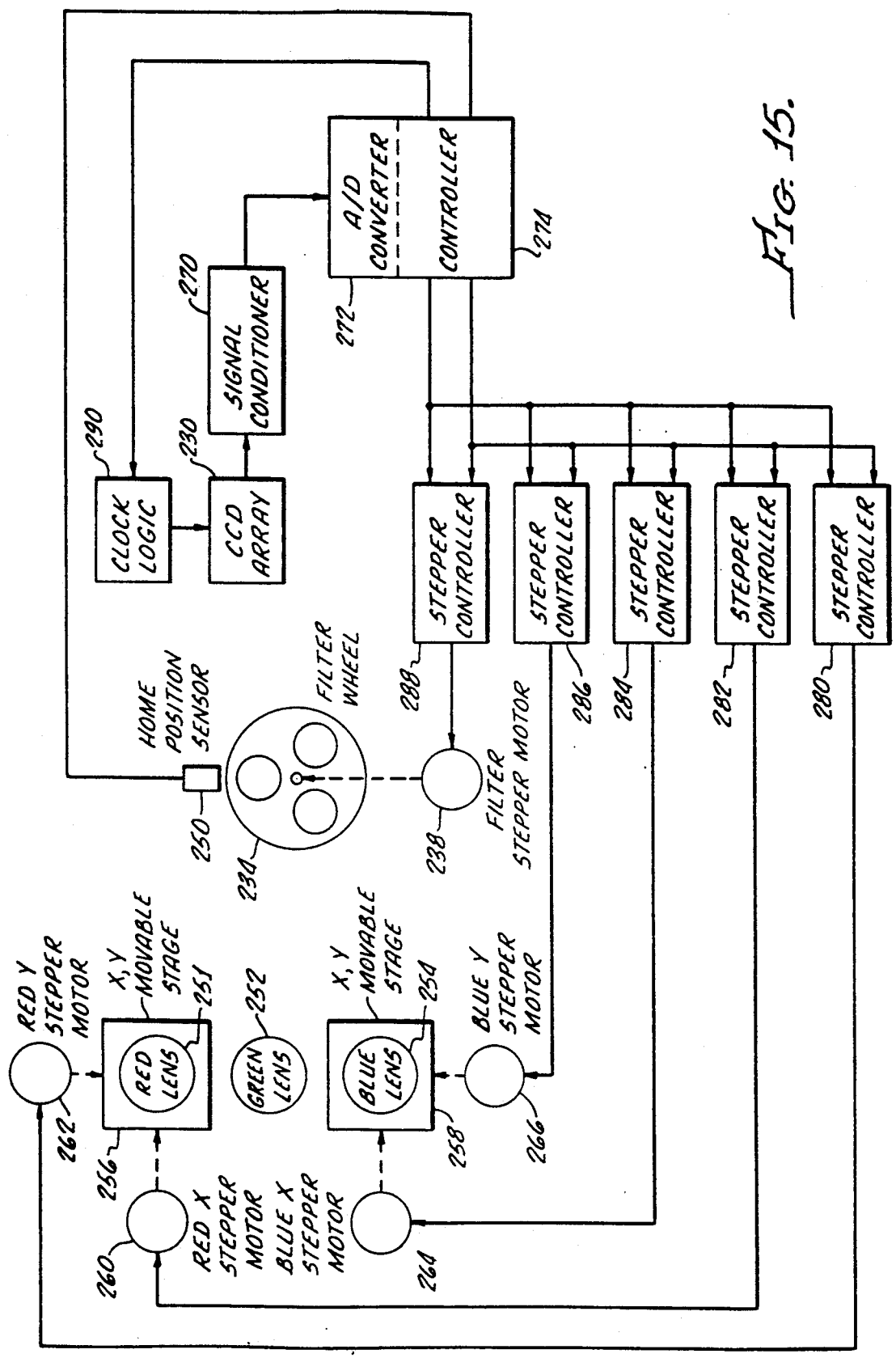
FIG. 15 is a functional block diagram of operation of the automatic convergence adjustment of FIGS. 13 and 14.

An arrangement of closed loop automatic convergence control is illustrated in FIGS. 13, 14 and 15. FIGS. 13 and 14 show the mounting of the sensor adjacent the viewer screen, it being understood that all other parts of the viewer previously described remain the same except for the fact that the manual control of adjustable lens position is replaced by motor control, as will be explained in connection with FIG. 15.

Mounted adjacent screen 140 of the viewer is a two dimensional CCD optical sensor array 230. The sensor is positioned with respect to the screen in a position in which the reference spots of the record film will be projected. As the reference spots have a fixed predetermined and known relation on the record film with respect to the image components, the sensor may be fixedly positioned in an appropriate location with respect to the screen. A filter wheel 234 rotatably carried in a hub 236 that is fixedly mounted in the viewer, is selectively driven by a stepper motor 238 and carries red, green and blue color filters 240, 242, and 244, respectively. The color filters are positioned adjacent the periphery of the wheel, so that, as the wheel is rotated the filters will sequentially pass in a position between the sensor and the projecting lenses of the viewer, momentarily stopping in such position. The filter wheel and filters 240, 242, 244 do not affect projecting image components. The projected red, green, and blue light passes to the respective color filters in sequence, with light of only one color passing through the respective filters 240, 242, 244 to the sensor at any one time. The size of the sensor array is sufficient to encompass the entire area over which the reference spots might be projected. It is not necessary that the reference spots have any fixed absolute position as long as they are all positioned in the same relation with respect to the associated color image component and within areas that ensure projection of the spot on a part of the sensor. The array may have a size of about 0.500 by 0.500 inches to provide a pixel array of 1024×1024 which will yield position resolution of 0.0005 inches. Such resolution is more than adequate to achieve the 0.006 inch image registration accuracy that is required as previously described.

The color filters are employed to distinguish between the reference spots associated with the individual color images. For example, if the red filter 240 is positioned over the sensor, the sensor will see only the reference spot associated with the red color image component since the latter is projected by the viewer with red light when all film image components are simultaneously projected. Further, the red filter will block blue and green light which project the blue and green color image components simultaneously with the projection of the red component. During this simultaneous projection of the three image components, the filter wheel is driven by the stepper motor to cause the three color filters to be sequentially positioned, and momentarily stopped, in front of the sensor. Positioning of the sensor wheel is controlled in part by a home position sensor 250 fixedly mounted to the viewer to sense and signal a reference position of the sensor wheel. The home position sensor is a conventional infrared optical interrupter which senses a notch in the edge of the wheel. The motor is positioned at the home position sensor when the green filter, for example, is in position over the sensor array 240.

As shown in FIG. 15, sensor 230 receives light through one of the red, green or blue filters projected by the red, green and blue lenses which are indicated in FIG. 15 by reference numeral 251, 252, and 254. As previously described, each of the red and blue lenses is mounted on lens stages or supports 256,258 respectively, which are moveable in both X and Y directions. Lens support 256 is driven by a red X stepper motor 260 and a red Y stepper motor 262. Similarly, the blue lens support 258 is driven by a blue X stepper motor 264 and a blue Y stepper motor 266 in the two mutually orthogonal directions. The sensor output signal is fed to a signal conditioner 270 and then through an analog-to-digital converter 272 to a lens controller 274 which calculates coordinates of the red and blue spots and compares these with the coordinates of the green spot to selectively drive the four stepper motors 260 through 266 via stepper controllers 280, 282, 284 and 286. Controller 274 also controls operation of the filter wheel by sending a signal via a filter stepper motor controller 288 to the filter stepper motor 238. Home position sensor 250 sends a signal to the controller for use and control of filter wheel position and also sends a signal via clock logic 290 to control scanning output of the sensor array.

In operation of the described automatic convergence control, the filter wheel is first sent to its home position, placing the green filter over the sensor and allowing the latter to be illuminated by only the green spot which falls somewhere on the sensor. After a short period in this position, the filter wheel is rotated by its stepper motor to place the red and blue filters successively over the sensor. The filter wheel stops momentarily when each filter is at the sensor, allowing it to see only red and blue spots, one at a time. These steps are performed while all three image components are projected on the screen. To sense the position of each color spot, the sensor data is clocked from the sensor in a conventional manner and sent through the signal conditioner, which normalizes the data, and then through the analog to digital convertor into the controller which has an appropriately programmed microprocessor. In the controller microprocessor a stored algorithm of conventional form calculates coordinates of the centroid of each spot. This positional information is used to adjust the viewer optics, moving red and blue lenses in X and Y so as to achieve automatic precise registration of the three color image components on the screen.

Using coordinates of the green spot as a reference, the microprocessor calculates positional errors of red and blue spots as coordinate differences. The differences are scaled by the ratio of stepper counts per pixel of the sensor, and signals are sent to the stepper controllers 280 through 286 for X and Y positioning of the red and blue lenses. The controllers respectively drive the four individual lens adjustment stepper motors 260 through 266 to move the adjustable supports on which the lenses are mounted. The lenses are thus moved to new locations where the positional coordinates of all three colored spots on the sensor are the same. When the spots are in register the color image components are also in register.

The cycle of correction is initiated when film is placed in the viewer film drawer and the drawer is closed, bringing film into position for projection. Switch 223, operated when the film drawer is closed (See FIG. 6), is connected to initiate the automatic convergence control cycle in addition to initiating application of the film holding vacuum system and turning on the lamps. A short delay such as about 5 seconds is provided after closing the drawer to allow the film to be appropriately flattened by the vacuum hold down.

Figure 16:
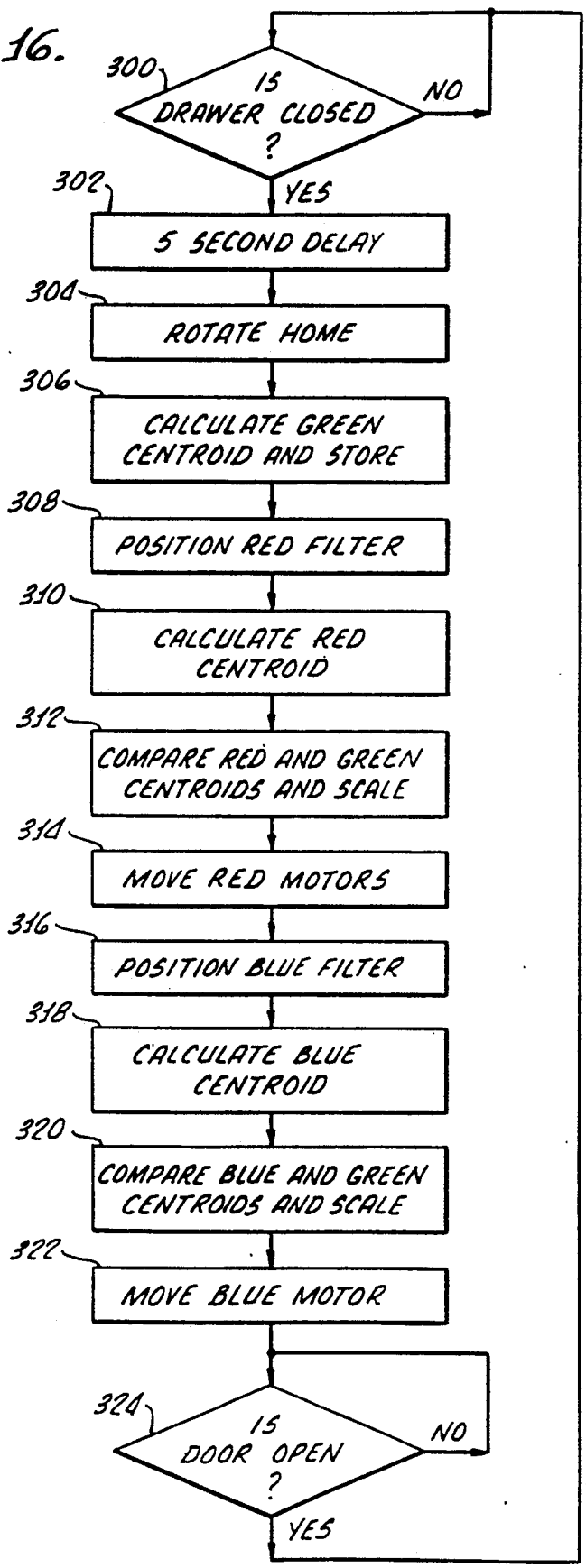
FIG. 16 is a flow chart of a program for the automatic convergence adjustment.

FIG. 16 illustrates operation of the microprocessor program of controller 274. As shown in this flow chart, the system waits for the door to be closed, block 300. Upon closing of the door a 5 second delay is initiated, block 302. Then the filter wheel is rotated to its home position, block 304, in which the green filter is positioned at the sensor. With the sensor information provided to the microprocessor the centroid of the green spot on the sensor is then calculated and its value stored, block 306. Now the filter wheel is again rotated to position the red filter into the light path adjacent the sensor, where the wheel momentarily stops, block 308. Then, as indicated in block 310, the microprocessor calculates the centroid of the red spot and, block 312, subtracts the coordinates of the red spot centroid from the stored coordinates of the green spot centroid, scaling these differences to provide the appropriate number of counts to drive the red stepper motors. The calculated stepper motor counts are then fed to the stepper motors to move the red stepper motors as indicated in block 314.

Having positioned the red lens into precision registration of the projected red and green images, the filter wheel is rotated to position the blue filter in the light path, where the wheel momentarily stops, as indicated in block 316. With the blue filter positioned in the light path the sensor sees only the blue light projected through the blue reference spot and can then calculate coordinates of the blue centroid as indicated in block 318. The calculated coordinates of the blue centroid are subtracted from the stored coordinates of the green centroid and an appropriate number of stepper counts is scaled for each of the X and Y blue stepper motors as indicated in block 320.

The blue stepper counts are fed to the blue stepper controllers to move the X and Y blue stepper motors, block 322, thereby positioning the blue image component in precision registration with the green image component. Operation of the stepper motors to adjust lens position moves the projected image components into more precise registration. Thus, all three projected image components are now precisely superimposed with the requisite precision. The system will then wait for the drawer to open as indicated in block 324, and return control to the start of the automatic convergence control cycle, block 300.

Conventional Cameras

Cameras specifically designed to provide the described three image component film records and having image component positioning of requisite precision are used to make film records for projection by the viewer of FIGS. 6–11. However, concepts of the present invention may be used in conventional, existing black-and-white multi-image cameras, with various types of modification, or with an external adapter, as will be described below. To afford a better understanding of adaptation of the present invention to known or existing equipment, some common conventional camera systems and operations will now be described.

Diagnostic ultrasound black-and-white images are usually recorded on film which is 8×10 inches, with 6 separate images on each film. The format of the images on the film is as illustrated in FIG. 1. It is useful to designate the arrays of image component and lens locations as shown, for example, in FIGS. 1 and 3, as an array of two vertical columns, each having three horizontal rows. In a conventional camera, image positions, but not sequence of exposure, are as shown in FIGS. 1 and 3. Thus, the three components 18,20,22 of the first color image as shown in FIG. 1 are positioned on film 16 with the red component of the first color image in the upper left corner (Col. 1, Row 1). The green component 20 of the first image is positioned in the center of the left side (Col. 1, Row 2), and the blue component of the first color image in the lower left corner (Col. 1, Row 3). The components of the second color image of the two images formed on the standard 8×10 inch film are also positioned as illustrated in FIG. 1, with the red component of the second image in the upper right corner (Col. 1, Row 1). The green component of the second image position is in the center of the right side (Col. 2, Row 2), and the blue component of the second image position is in the lower right corner position (Col. 2, Row 3) of the film. The conventional black-and-white camera locates its six images in the same positions, but in the following sequence: Position 1 (Col. 1, Row 1), Position 2 (Col. 2, Row 1) , Position 3 (Col. 1, Row 2) , Position 4 (Col. 2, Row 2) , Position 5 (Col. 1, Row 3) , and Position 6 (Col. 2, Row 3).

During a diagnostic ultrasound examination procedure, when the medical sonographer wishes to record an image that is observed on the viewing screen of the ultrasound scanner console, a button or a footswitch is pressed to initiate a film recording cycle. For a new sheet of film, the first image is normally recorded at Position 1, in the upper left-hand corner. The next time an image is recorded, it is placed at Position 2, etc. When all 6 positions have been used for recording images, the film is full and another sheet of film is used for further images, starting at Position 1 again. The operator need not be involved in placing the images; the equipment takes care of doing that. The individual images can be identified by date and time information which is incorporated in each image.

There are various kinds of apparatus for producing film records of this type and format. Such apparatus are known variously as cameras, film recorders, or printers, and they use various technologies. Some of these are described above. Sometimes there is a direct connection between a single diagnostic ultrasound machine and a single camera which is dedicated to it; sometimes one camera or printer is shared by several diagnostic ultrasound machines. In the latter case, sometimes the pieces of equipment are wired together and electronic multiplexing is used to direct the electronic images in the network; or sometimes the electronic images are captured or commanded by an acquisition unit at each diagnostic ultrasound machine, using disks or tape, which are later physically taken to a shared camera for recording on film.

A common configuration, particularly in small installations, is use of a single camera dedicated to a single diagnostic ultrasound machine. Usually, the camera is mounted in the ultrasound cart, so that it is permanently wired to the ultrasound machine, being disconnected only for maintenance or repair.

Currently the most common type of camera for dedicated applications is one that is CRT-based. The video signal from the ultrasound machine, usually a standard EIA RS-170 composite black-and-white video signal containing the same electronic image which is displayed on the ultrasound console screen, comes into the camera on a cable. If the camera is connected to a diagnostic ultrasound machine which has color as well as black-and-white capability, then when the ultrasound machine is in black-and-white mode its camera output is as above; but when the ultrasound machine is in its color mode its camera output is a similar signal containing only the Y or luminance component of the electronic image. In the camera, the video image (with or without intermediate signal processing) goes to an internal video monitor, where it can be displayed on command by the internal CRT. An optical system projects the CRT image onto the film and a photographic snapshot is taken. Usually the film used in cameras like this is so-called video recording film, which is similar to silver-halide X-ray film except that it is coated with light-sensitive emulsion on only one side. The film can be quickly processed in conventional X-ray film processors in radiology departments. It may be noted that, for illustrative purposes, both the description of the system embodying the present invention and its components and the description of conventional black-and-white multi-image cameras in this section refer to CRT-based, dedicated cameras that use video recording film. Nevertheless, film for the disclosed system can be produced by any means which puts six precisely sized and precisely located images on a sheet of film. Use of the multi-component system disclosed herein is not limited to a CRT-based camera.

In CRT-based cameras of this kind, there are various ways of distributing the successive images to their proper places on the film. In some cameras there are six separate lenses, each of which projects the CRT image to a different position on the film. The lenses are normally blocked by a shutter or shutters, and one at a time is unblocked to take a snapshot of the CRT. In some there are two lenses which are shuttered to take snapshots in positions 1 and 2. Then, either the lenses are moved or the film is moved and snapshots are taken in positions 3 and 4, and after another movement, in positions 5 and 6. In some cameras there is a single lens which moves to multiple positions, and in some the CRT moves as well. The same effect can be accomplished by moving mirrors in the image path to various positions. Yet another technique is to assemble all of the images, one by one, into an electronic memory, and then display them all at once, properly formatted, on the CRT face and take a single snapshot of the entire array on the film.

These cameras sense when a new film is inserted, and set the internal camera controller to place the first image in position 1, the next image in position 2, etc. Frequently there are front-panel indicators to signal which image position is the next active one. When the 6 positions are used up the camera will record no further images, and it signals the operator to change the film.

As part of the image recording cycle there is usually an internally controlled calibration routine to keep film exposures consistent so that density range is the same for all images. A common way to do this is to display a test pattern on the CRT, with shutters closed, before each exposure, look at it with a calibrated photocell, and automatically adjust either the exposure time or monitor brightness and contrast.

The control panel of a typical camera usually contains several controls and indicators. The controls may include a power switch, an input selector, if more than one video input can be accommodated, a video invertor to choose between a positive and a negative image on the film, controls for setting exposure parameters, including monitor contrast and brightness and exposure time, an "expose" button to initiate the image recording cycle, and an "advance" button to increment the next active image position ahead one step without recording an image. This last function allows exposing of images in positions that are out of the normal sequence. If an image position is skipped by using the "advance" feature, then after the highest-numbered image position is exposed, the exposure sequence "wraps around" to the lowest-numbered unused position and then uses the remaining unused positions in ascending order until they are all used up.

Among the control panel indicators of such conventional camera is usually a group of lights which indicate the 6 image positions on the film. Typically, a light will be green if that position has not been exposed yet, red if it has already been used, or flashing red/green if it is the next active image position to be exposed. The control panel may also have indicators to show positions of various controls, and an alphanumeric display which can be selected to show the values of exposure parameters which have been set.

External electrical connections of these existing cameras usually include one for power, one for video input (sometimes 2 which can be selected by a switch), and one for externally initiating the image recording cycle. The latter can be connected to a footswitch or to the keyboard of the host ultrasound machine. Many cameras also have an EIA RS-232 digital control port through which signals that duplicate all the front-panel controls and indicators can be sent to and from the camera. Using that port, external equipment can be connected to the camera to control its functions, set its conditions, and receive information about its status. The RS-232 digital control port can be used with an external adapter, to be described below, to make a conventional black-and-white camera operate as a part of the system disclosed herein.

It may be noted that when a camera of the type described above and shown in FIGS. 2-5 herein is in its black-and-white mode, which is when the host ultrasound machine to which it is connected is in its own black-and-white mode, the camera behaves like a conventional black-and-white camera described in this section, and produces films with six different black-and-white images in the conventional positions and sequence.

Adapter For Existing Cameras

Systems of the present invention, which have been described above in connection with FIGS. 1-16, have used cameras originally designed to work as part of the system. But in some situations, it may be desirable to consider adapting conventional black-and-white multi-image cameras to work in the novel system disclosed herein. Such adaptations can be at 3 levels: (a) modifications to existing camera designs, permitting new cameras to be manufactured with the new capability without complete redesign; (b) modifications to existing cameras, either in the field or at the factory, to adapt them to work in the new system; (c) addition of an external adapter to existing cameras to give them capability of the new system with no internal modifications, or at most some changes in adjustments. There are a great many conventional multi-image cameras already installed at sites where upgrading to novel systems disclosed herein might be desirable, so the advantage of adaptation of existing cameras is significant.

In order for existing cameras to be candidates for adaptation to the novel system disclosed herein without degrading performance, they must have some special characteristics: (a) size, placement, and matching of images on the film must be compatible (or adaptable to being made compatible) with the attributes of the described viewers; (b) optical distortion and density shading of images must be low enough to assure adequate registration and color consistency of displayed composite images; (c) mechanical stability of the structure must be adequate to assure repeatability of optical performance; (d) the camera's electronic controller must have the latent capability of being converted to place the separate color record images in the color component sequence described above, such as by means of a digital control interface which provides a window into the camera controller. All existing conventional cameras may not meet these requirements.

Two basic capabilities must be added:

A. The camera has to accept electronic images in color video form, preferably in RGB format, and it has to be able to switch among the color components.

B. The camera has to select the color components and direct them so that they are automatically recorded in their proper places, in proper sequence, on the film.

These added capabilities are readily provided by the adapter described below.

Typically, a diagnostic ultrasound machine with color capability will have its video image output in the form of 4-line color, i.e. R, G, B. and sync. The separate color video signals are in conventional RS-170 form, but they do not contain composite sync information; instead, the sync is on a separate line. When the ultrasound machine is in black-and-white mode, the only difference is that the signal on all 3 color channels is the same. Conventional black-and-white cameras do not accept video signals in this form. Their video input capability is for single-line monochrome RS-170 composite video signals, containing sync information on the same line.

Illustrated in FIG. 17 is an adapter for use with a known multi-image black-and-white camera, that is normally arranged for accepting such single-line monochrome RS-170 composite video signals. Such a camera is illustrated in FIG. 17 at 330 and may be, for example, the Aspect or Frantz 810 camera, having characteristics described above. An adaptor generally indicated at 332 is provided to receive signals from the conventional color ultrasound scanner such as the scanner 10 of FIG. 2, and put these signals in a form that enables the multi-image black-and-white camera 330 to produce multi-component color image component records. The existing multi-image camera 330 includes suitable arrangements such as a plurality of lenses, for example, that enables this camera to expose on a conventional standard 8×10 inch sheet film a plurality of images in the common six image format and position sequence described above. The adapter provides the signals and controls the required functions to feed the appropriate color component signals to camera 330 and simultaneously to control its CRT blanking and shutters for placement and exposure of the three red, green, and blue color image components on the sheet film in the positions required for the viewer described above. These positions, as previously described (FIG. 1) are image component locations 18, 20, 22 for R, G and B components of a first color image, and image component locations 24, 26, 27 for R, G and B components of a second color image. Thus the adapter, as one of its functions, changes the image positioning sequence of the conventional camera.

The four-line video from the diagnostic scanner is provided on lines 334, 336, and 338 as the red, green and blue components, respectively, and includes a sync signal on a line 340. The three color video signals are fed to an adapter multiplexer 342, that is controlled by an adaptor controller 344 which basically performs the functions of the controller 76 of FIG. 2. The multiplexer is controlled to select one color at a time, to be fed to a composite video generator 346 which also directly receives the sync signal on line 340. The composite video generator produces a video signal in the standard RS-170 composite monochrome video format with sync included, and contains the video portion of the selected color image component. This video signal is fed to the video input of the conventional camera 330.

Adapter controller 344 is provided with two selectable microprocessor programs, one for color mode and one for black-and-white mode. Selection of color or black-and-white is made by an externally controlled mode switch 350. A signal on an externally controlled command line 352 connected to the controller 344 initiates an exposure cycle either in color or black-and-white. Controller 344 is also connected to the multiplexer to select the appropriate color component. The controller also has a connection via a line 354 to the standard RS-232 control input of camera 330. Appropriate commands are formatted in accordance with RS-232 protocol and stored in the controller memory to be transmitted under program control to the camera controller in order to initiate camera functions or to be recognized by the adapter controller in order to indicate camera status.

When in color mode, as selected by the adapter mode switch 350, and when a new film is in the camera, the following sequence of steps is performed under control of the microprocessor program upon occurrence of an expose command on line 352 to the adapter. Control signals from the adapter to the camera, and status signals from the camera to the adapter are transmitted by RS-232 interface connection 354.

A) The expose command line is locked so that another expose command will not be accepted until the entire exposure sequence is completed.

B) The multiplexer selects the red video signal component from the scanner and generates a composite monochrome video signal from this red signal component, sending that signal to the camera. An internal expose command is sent from the adapter to the camera control and initiates an exposure cycle in the camera.

C) The image, which is that of the red image component, is recorded at position 1 (Col. 1, Row 1) of the camera. As mentioned above, in normal operation of the standard camera images are recorded in sequence in positions 1 through 6 in black-and-white. Thus, the first exposure (red, for example) controlled by the adapter in color mode is at position 1 (Col. 1, Row 1). The camera's controller sets the next exposure to be made at position 2 (Col. 2, Row 1), but this is not the desired location of the next (green) component, so position 2 will be skipped.

D) After receiving a ready signal from the camera's controller indicating that the first exposure has been completed the adapter sends an "advance" command to the camera causing the camera controller to set the next exposure to be made at position 3 (Col. 1, Row 2). Position 2 is skipped at this time.

E) The adapter multiplexer next selects the green video signal from the scanner, generating a composite monochrome video signal and sending that signal to the camera.

F) An internal expose command is sent to the camera which initiates an exposure cycle as in step B. The image of the green component is then recorded at position 3 and the camera controller sets the next exposure to be made at position 4 (Col. 2, Row 2). Position 4 will be skipped at this time.

G) After receiving a ready signal from the camera an "advance" command is sent to the camera causing its controller to set the next exposure (blue component) to be made at position 5.

H) The multiplexer now selects the blue signal from the scanner, generates a composite monochrome video signal and sends it to the camera.

I) An internal expose command is sent to the camera which initiates another exposure cycle. The blue image component is then recorded at position 5 and the camera's controller sets the next exposure to be made at position 6 (Col. 2, Row 3).

J) After receiving a ready signal from the camera an advance command is sent to the camera. The controller then attempts to set the next exposure to be take at position 1 ("wrap-around"), but finding that position has already been used, moves to position 2 as the next active position. Thus, the three color image components of the one color image have been recorded at positions 1, 3 and 5 which are the same as positions of the image components 18, 20 and 22 of FIG. 1.

K) The external expose input command to the adapter is unlocked so that another exposure of three color image components can be initiated.

The next three-part exposure of a second color image on the same film takes place according to the following sequence, after a second expose command is given to the adapter.

L) External expose command line is locked.

M) The multiplexer selects the red video signal (at the second image) from the scanner and generates a composite monochrome video signal that is sent to the camera.

N) An internal expose command is sent to the camera which initiates an exposure cycle. The red image component is then recorded at position 2 (Col. 2, Row 1) on the film and the camera's controller tries to set the next exposure to be taken at position 3 (Col. 1, Row 2). Finding that position is already used, the camera moves to position 4 (Col. 2, Row 2) as the next active position. (As previously mentioned, the standard control circuitry of the conventional camera provides means for determining whether or not a position at which an exposure is to be made has been previously used and, if so, advances the camera to cause an exposure at the next succeeding position.)

O) After receiving a ready signal from the camera, the multiplexer selects the green video signal and generates a composite monochrome video signal that is sent to the camera.

P) An internal expose command is sent to the camera which initiates an exposure cycle. The green image component is recorded at position 4 (Col. 2, Row 2) on the film. The camera's controller tries to set the next exposure to be taken at position 5, but finds this position already used and moves position 6 (Col. 2, Row 3) as the next active position.

Q) After receiving a ready signal from the camera the multiplexer selects the blue video signal, generates a composite monochrome video signal and sends it to the camera.

R) An internal expose command is sent to the camera which initiates an exposure cycle. The blue image component is recorded at position 6 on the film.

S) The film is now completely used. All six positions have recorded image components thereon in the positions needed for the viewer and the camera signals the operator to change film. After the new film has been inserted, the camera sends a ready signal to the adapter causing it to unlock the external expose command line whereby the system is now ready to start over to record two additional images.

If the adapter has been set in the black-and-white mode by the mode selector, the sequence is different. When an expose command is given to the adapter and a new film is in the camera the following steps are performed under command of the adapter controller 344.

The multiplexer selects the line of the green video signal, generates a composite monochrome video signal and sends that to the camera.

U) An internal expose command is sent from the adapter to the camera via the interface command line 354 which initiates an exposure cycle in the camera including any pre-exposure calibration routine that the camera may employ. The image, which is that of the monochrome image from the scanner, is recorded at position 1 on the film. The controller of the camera 330 then sets the next exposure to be made at position 2, which is the standard sequence of the conventional camera.

The next time the expose command is given to the controller, the camera is already receiving the signal on the "green" line from the adapter. Therefore, an internal expose command is sent from the adapter to the camera to initiate an exposure cycle in the camera which records the image at position 2 on the film and sets the next exposure to made at position 3.

Subsequent actuation of the expose command of the adapter will cause exposures to be made at the subsequent positions on the film. After an image is recorded at position 6 the film is used up and the camera signals the operator to change film. After insertion of new film the camera sends a ready signal to the adapter and the system is now ready to start exposing another film in either color or black-and-white.

It should be noted, as mentioned above, that the conventional black-and-white multi-image camera may not be designed and constructed to hold sets of image locations in positions 1 through 6 on the film to the closer positional tolerances that are required to achieve adequate registration of the three color image components in the viewer described herein. Accordingly, image position adjustment may be necessary in the viewer as the record image components fixed on the film cannot be moved. Such adjustments may be made either manually or by a viewer with automatic convergence control as described above.

Rotating Lens Board

Figure 18:
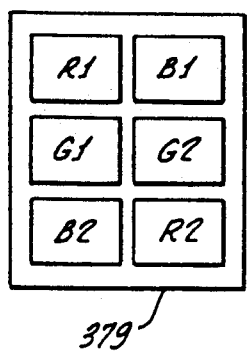
FIG. 18 (sheet 11) shows an alternative film record image component arrangement.
Figure 19:
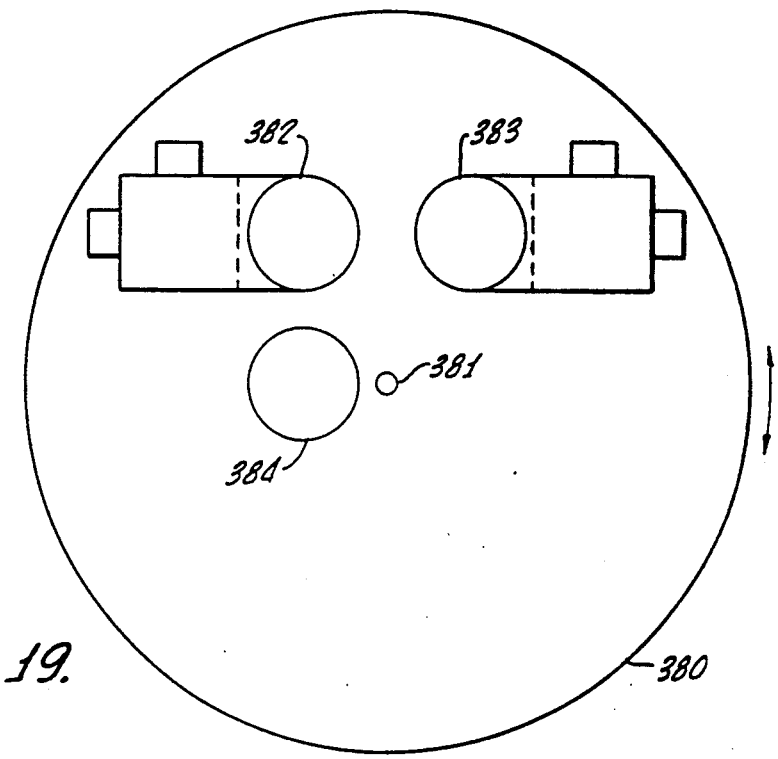
FIGS. 19 and 20 show portions of a modified viewer with movable lenses.
Figure 20:
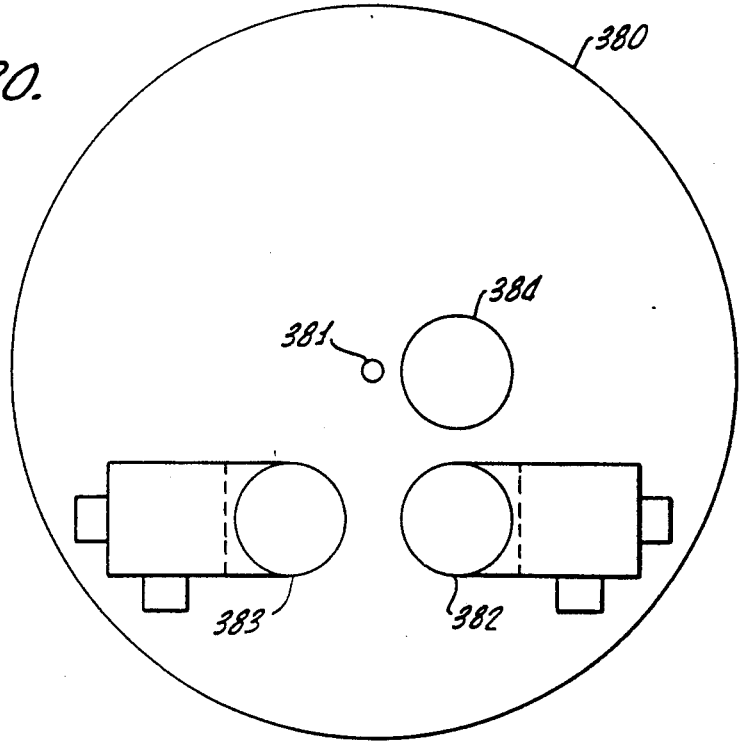

As set forth above, the adapter of FIG. 17 is programmed to cause the conventional camera (in color mode) to expose image components in a sequence (Col. 1, Row 1; Col. 1, Row 2; Col. 1, Row 3; Col. 2, Row 1;

Col. 2, Row 2; Col. 2, Row 3) different than the black-and-white standard sequence (Col. 1, Row 1; Col. 2, Row 1; Col. 1, Row 2; Col. 2, Row 2; Col. 1, Row 3; Col. 2, Row 3) that is normally followed by the conventional camera. However, it may not be desirable or feasible to modify exposure sequence of certain conventional cameras. Therefore, in order to allow the conventional camera to expose image components in the same normal or standard sequence of positions for both black-and-white and color mode, the viewer may be modified as shown in FIGS. 19 and 20 (sheet 11). FIG. 18 shows a standard sheet of film 379 having two sets of color image components R1, B1, G1 for a first image and G2, B2, R2 for a second image. These components are positioned on film sheet 379 in the positions and sequence controlled by a standard camera following its standard sequence of black-and-white exposure positions. Thus, in sequence, the standard camera exposes the three components R1, B1, G1 of the first image in first, second and third positions of its standard sequencing and, continuing its standard sequencing for the second image, sequentially exposes components G2, B2, R2 in the standard fourth, fifth and sixth positions, as illustrated in FIG. 18. This color component sequence (R,B,G,G,B,R) is different than the color component sequence employed in embodiments described above, but requires only a change in the sequencing of the adapter multiplexer.

For viewing of image components arranged in positions shown in FIG. 18, the viewer is modified as shown in FIGS. 19 and 20. This viewer configuration enables viewing of two full images, namely all six color image components, on a sheet film with but three projection lenses. For viewing a film record having color image components of two images of which components are arranged as illustrated in FIG. 18, three projection lenses are mounted on a rigid lens board 380 (FIG. 19) that pivots about an axis 381. Lenses 382, 383, and 384 are mounted on the board in the angulated or inverted L-shaped configuration illustrated in FIG. 19. These lenses are in positions 1,2 and 3, Col. 1, Row 1; Col. 2, Row 1; and Col. 1, Row 2, with the board 380 oriented as shown in FIG. 19. These lenses are provided with three separate light sources, three separate condenser lenses and three separate light path isolation tunnels formed by the series of baffle plates, all described in connection with FIGS. 6 and 7. A second set of three lenses, such as the second set of FIGS. 6 and 7, namely lenses 132A, 134A, and 136A, together with the related structures are not employed in the arrangement of FIGS. 19 and 20.

In the arrangement of FIGS. 19 and 20 the green lens 384 is fixedly mounted on the board and in a position corresponding to image position three (G1 in FIG. 18) of the film, whereas red and blue lenses 382 and 383 are mounted on the board in positions corresponding to positions R1 and B1 of the film of FIG. 18. If deemed necessary or desirable the red and blue lenses as previously described may be mounted to the board on movable stages for X and Y adjustment to enable registration in precise superposition of the three superposed projected images. Thus, the red, blue and green lenses are mounted in positions geometrically congruent with the first three standard positions on the film, so that the components of the first image may all be projected in superposition on the screen by means of lenses 382,383,384.

To enable viewing of the second image (components G2, B2, R2 in standard positions 4, 5 and 6) with this viewer and film configuration, the lens board is rotated 180° about axis 381 to position the lenses as illustrated in FIG. 20. In this position the respective green, blue and red lenses 384, 383 and 382 are in positions congruent with the film positions 4, 5 and 6 of image components G2, B2 and R2 of FIG. 18.

The embodiment illustrated in FIGS. 18 through 20 enables use of a viewer with fewer components and permits standard camera sequencing. No change in black-and-white exposure sequencing of the standard camera is needed.

In use of this viewer for viewing two different images on a film configured and arranged as illustrated in FIG. 18 the first image is viewed with the rotatably adjustable lens board 380 in the position illustrated in FIG. 19 whereas for viewing the second image lens board is rotated to the position illustrated in FIG. 20. If motors are used to adjust the movable stages of the "red" and "blue" lens positions relative to the fixed "green" lens, the motors may be part of a closed loop automatic image registration (automatic convergence) system as described above. The movable stages have to move in opposite directions in the two positions of the lens board to properly control image registration. This is achieved by changing polarity of the motor drive signals when the lens board is rotated from one position to the other.

Staggered Lens Viewer

Figure 21:
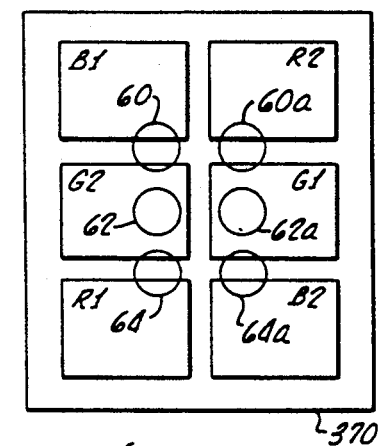
FIG. 21 (sheet 10) illustrates staggered positioning of film record image components.
Figure 22:
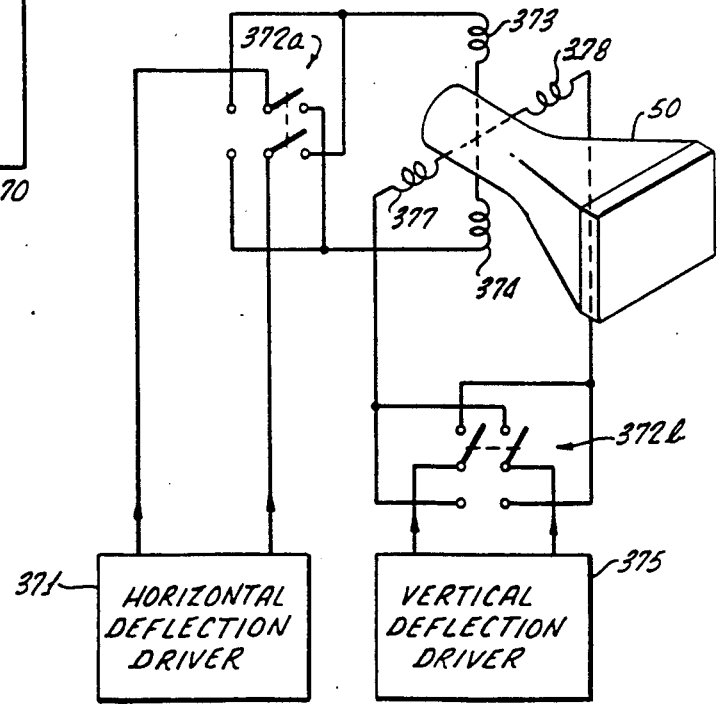
FIG. 22 shows an arrangement for reversing deflection directions of the CRT.
Figure 23:
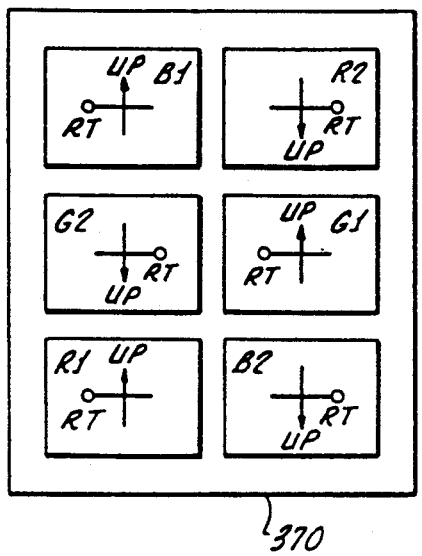
FIGS. 23-26 illustrate modified arrangements and orientations of film record image components.

In another modification of the described system, as shown in FIGS. 21-27, improved physical size and layout of the lenses are provided and the viewer has only one group of three lenses arranged in staggered relation. These lenses are provided with three separate light sources, three separate condenser lenses and three separate light path isolation tunnels formed by the series of baffle plates, all as described in connection with FIGS. 6 and 7. The second set of three lenses of FIGS. 6 and 7, namely lenses 132A, 134A, and 136A, together with the related structures are not employed in the arrangement of FIGS. 21-27. To utilize such a viewer, having only three lenses, the film record sheet is recorded with a single appropriately positioned group of three color image components. However, two such groups may also be employed, provided that the respective color image components of each image are positioned as illustrated in FIG. 21 (sheet 10). Each of the two color images formed on a film sheet 370, includes three separate color image components designated B1, G1, R1 and R2, G2, B2, respectively in FIG. 21. To be capable of use with a viewer having but three lenses, the components of the first image are respectively, positioned on film sheet 370, in a staggered relation. Thus, components of the first image as shown in FIG. 21 are positioned on film 370 with the blue component B1 of the first image in the upper left corner (Col. 1, Row 1), the green component G1 of the first image in the center of the right side (Col. 2, Row 2) and the red component R1 of the first image in the lower left corner (Col. 1, Row 3). The components of the second image of the two images formed on the standard 8×10 inch film are also positioned as illustrated in FIG. 21, with the red component R2 of the second image in the upper right corner (Col. 2, Row 1), the green component G2 of the second image in the center of the left side (Col. 1, Row 2) and the blue component B2 of the second image positioned in the lower right corner (Col. 2, Row 3) of the film. The several image components have unique orientations, as illustrated in FIG. 23 (sheet 12) and as will be described below.

Figure 27:
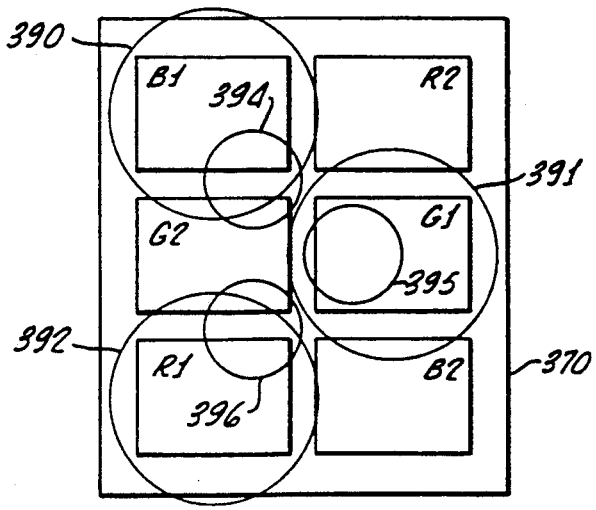
FIG. 27 shows arrangement of lenses of a modified viewer for use with film records of FIGS. 23-26.

In a camera arranged to expose image components in the arrangement of FIG. 21, the monochrome images representing the individual color image components are first electronically formed, in sequence, on the face of the CRT, as previously described and then optically distributed, by appropriate sequential operation of the lens shutters, to be projected to six different positions on the film through the six different camera lenses 60, 62, 64 and 60a, 62a, 64a. The lenses of the modified viewer are positioned with respect to the various image components of the two images of sheet film 370 as illustrated in FIG. 27 (sheet 12).

The camera configuration for providing the image component distribution of FIG. 21 is the same as that previously described and illustrated in FIGS. 2, 3, 4 and 5, but with the deflection controls of the cathode ray tube modified to enable reversal of the deflection signals to obtain selected image component orientations. Thus, as shown in FIG. 22 (sheet 10), the signal from a horizontal deflection drive 371 for the CRT 50 is fed through 2 poles of a 4-pole, double throw relay 372a, having A and B positions, to the horizontal deflection coils 373, 374 of the cathode ray tube. Similarly, vertical deflection signals from a vertical deflection driver 375 of the cathode ray tube are fed through the other 2 poles of the 4-pole, double throw relay 372b, having positions A and B, to vertical deflection coils 377, 378 of the cathode ray tube. The arrangement enables selectively turning the recorded images upside down and from right to left by reversing polarity of the current to the deflection yoke coils. The displayed raster can be scanned on the CRT face either from top to bottom or from bottom to top in the vertical direction, and either from left to right or right to left in the horizontal direction. If the vertical direction of scan and the horizontal direction of scan are both reversed the effect is to turn the image upside down. As a practical matter, the polarity of the sweep currents cannot be switched instantaneously, because the high energy of the sweep would result in arcing at the relay contacts that would cause them to deteriorate. It is necessary to turn off the sweeps before switching and turn them back on after switching. Since the switching is done between images, this is not a difficulty. An alternative is to do the switching electronically. These details, which use standard techniques, are not shown.

Sets of image components are positioned on the record film 370 in the six positions illustrated in FIGS. 21 and 23. Also illustrated in FIG. 23 are the unique orientations of the individual image components. Thus, the components of the first image, that is, components B1, G1, and R1, as shown in FIG. 23, are positioned right side up (as indicated by the arrows), but are reversed from right to left (as indicated by lines with a circle on one end), whereas the components R2, G2, B2 of the second image, as shown in FIG. 23, are positioned normally from right to left, but are all upside down. In the image orientation convention used herein, the arrows point to the top of the image and the circle is at the right side of the image. These orientations enable simplified viewing of both sets of images with a viewer having but three lenses as will be described below. With the film record components positioned and oriented as illustrated in FIG. 23 the viewer arrangement illustrated in FIG. 27 (to be described below) will provide a composite projected first image oriented as indicated at 380 in FIG. 24. This projected image has normal orientation in both up and down directions and from right to left.

Figure 24:
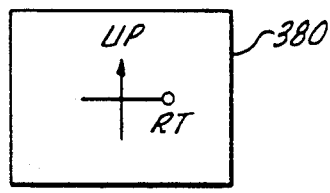

For use with a record having the component arrangement of FIG. 23, the viewer lenses are configured in a staggered arrangement similar to the staggered arrangement of the image components of one image of the film. The staggered arrangement of the three viewer lenses includes a blue projection lens 394 (FIG. 27) positioned toward an upper left side of the group as viewed in the direction looking from the lenses toward the screen. This corresponds to Col. 1, Row 1 of the record array. A green projection lens 395 is positioned at an intermediate right section (Col. 2, Row 2) of the lens group and a red projection lens 396 is positioned at a lower left portion (Col. 1, Row 3) of the group. The blue, green and red viewer lenses are positioned to project light passing through three image components in positions B1, G1, and R1 of film 370. FIG. 27 illustrates the relative position of the components of the first image on film 370 with respect to the three projection lenses 394, 395, 396, with the film 370 oriented for projection of the first image (components B1, G1, R1). In this arrangement condenser lenses 390, 391 and 392 are, as previously described, positioned in the same staggered arrangement immediately adjacent the respective staggered film image components and symmetrically arranged with respect to the associated film image components. Orientation of the projected first image when the film 370 is positioned in the viewer in the orientation shown in FIGS. 23 and 27, as previously described, the normal orientation is shown in FIG. 24.

Figure 25:
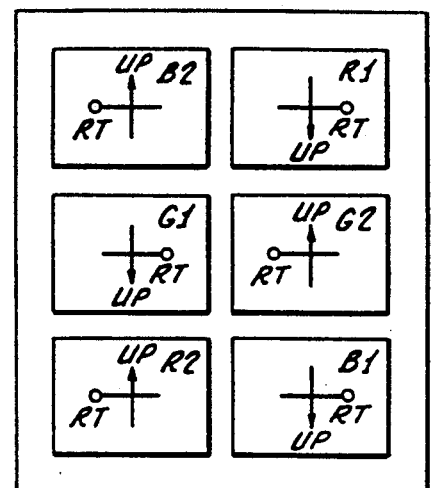

The camera configuration employed for making the record shown in FIG. 21 is the same as that previously illustrated. It has an optical system with lenses that operate with an object outside their focal points and with a single mirror. Therefore, the lenses invert the images left to right and top to bottom and the mirror reverses the images again, top to bottom only. Orientation of the color image components of the first image as shown in FIG. 23 is accomplished by sweeping the CRT scan bottom to top vertically and left to right horizontally. Assume this corresponds to position A of the relay 372 of FIG. 22. To obtain the orientation of color image components of the second image as shown in FIG. 25 the relay is switched to position B to change the sweep directions to top to bottom vertically and right to left horizontally, which turns the images upside down with respect to the components of the first image.

Employing the previously described camera with the deflection reversing relay illustrated, in FIG. 22, the three-component electronic color image is spatially encoded on the record film in the positions assigned to the first image as illustrated in FIG. 23, by the following sequence of steps controlled by the camera microprocessor.

A) Place the sweep reversing relay in position A.

B) Open the shutter of the lens in the red position (lens 64, Col. 1, Row 3 of FIG. 21).

C) Select the red component electronic image via the multiplexer and direct it to the monitor. Unblank the CRT to display the image. After the proper exposure time (typically one second) blank the CRT.

D) Close the shutter of the lens in the red position and open the shutter of the lens in the green position (lens 62a, Col. 2, Row 2 of FIG. 21).

E) Select the green component electronic image and direct it to the monitor. Unblank the CRT, displaying the green image component. After the proper exposure time blank the CRT. F) Close the shutter of the lens in the green position and open the shutter of the lens in the blue position (lens 60, Col. 1, Row 1).

G) Select the blue component electronic image and direct it to the monitor. Unblank the CRT displaying the blue image component. After the proper exposure time blank the CRT.

H) Close the shutter of the lens in the blue position.

The three image components of the first image have now been exposed on the film.

With the camera in its color mode and when a film holder is first inserted into the camera the camera controller sets the state of the camera to record a color image in the manner described above, recording color image components R1, G1, and B1. If the film holder is not removed the controller thereafter sets its state to record the next color image as a second color image with the following sequence of steps.

I) Put the sweep reversing relay into position B.

J) Open the shutter of the lens in the red position (lens 60a, Col. 2, Row 1 of FIG. 21).

K) Select the red component electronic image and direct it to the monitor. Unblank the CRT, displaying the image. After proper exposure time blank the CRT.

L) Close the shutter of the lens in the red position and open the shutter of the lens (62) in the green position (Col. 1, Row 2).

M) Select the green component electronic image, direct it to the monitor, unblank the CRT to display the image and blank the CRT after the proper exposure time.

N) Close the shutter of lens in the green position and open the shutter of the lens 64a in the blue position (Col. 2, Row 3) for this image.

O) Select the blue component electronic image, direct it to the monitor, unblank the CRT and display the image. Blank the CRT again after the proper exposure time.

P) Close the shutter of the lens in the blue position.

The three image components of the second image have now been exposed.

With the camera in its black-and-white mode, instead of the just described color mode, the sweep reversing relay remains in the A position at all times so that all six images on the film have the same orientation, which is the orientation shown in FIG. 23 for the first image. This orientation, with the film emulsion side up has the images correct top to bottom but all reversed left to right. To view the black-and-white images in correct orientation on a conventional light box the film is turned over side to side (e.g. rotated about an axis lying in the film plane and extending from top to bottom of the film) so that its emulsion side is down. This is the normal way of viewing black-and-white films in order to protect the emulsion surface. Now the images are correctly oriented both top to bottom and left to right.

In the black-and-white mode of the camera, when the film holder is first inserted into the camera, the camera controller will set the camera state so that the first image is placed in the upper right corner (Col. 2, Row 1) of the film, looking at the film with emulsion side up. This is done so that this image component will be in the upper left corner (Col. 1, Row 1) when the film is turned over. After the first image is recorded the next active image position is in the upper left corner (Col. 1, Row 1). The active image positions then progress right to left and top to bottom until six positions are filled. The film holder then is removed from the camera. The electronic image signal comes into the camera on the green multiplexer channel and is permanently selected in this black-and-white mode to send the signal to the monitor. For each image of the six black-and-white images the sequence is as followings.

Q) Open the shutter of the lens corresponding to the first active image (Col. 2, Row 1) position.

R) Unblank the CRT displaying the image and then blank the CRT after the proper exposure time.

S) Close the shutter.

T) Advance to the next active image position (Col. 1, Row 1).

Repeat for the remaining positions.

It will be understood that the common exposure control calibration may be carried out before each exposure of the camera in conventional fashion so as to maintain constant exposure parameters on the film.

As previously mentioned the viewer employed for the described staggered image component film configuration of FIG. 21 is substantially the same as that previously described in FIGS. 6, 7, 8, 9, 10 and 11, except for the fact that there are only three light sources, three condenser lenses and three projection lenses. Positions of the projection lenses and the condenser lenses are illustrated in FIG. 27 which is a top view of the viewer. In this view the projection lenses 394,395,396 are above the film and the condenser lenses 390,391,392 are beneath the film.

For color projection by the modified viewer of FIG. 27 to view spatially encoded color images on black-and-white film having two sets of recorded image color components arranged as illustrated in FIG. 23, the film is placed in the film drawer and the drawer closed, to position the film image components in the optical projection path. For viewing of a first color image (B1,G1,R1), the film is positioned in the drawer in the orientation relative to the lenses as illustrated in FIG. 27. The three color record image components are projected in mutual superposition on the viewer's projection screen, the red component with red light, the green component with green light and the blue component with blue light. The color image components of the second image are not projected on the screen because there are no light sources or projection lenses in line with these components.

The projection lenses of the viewer in the arrangement illustrated in FIG. 27, reverse the film images both left to right and top to bottom, and the single mirror in the optical path of the viewer (mirror 142, FIG. 6) reverses the images top to bottom again. The resultant composite color projection of the first image therefore appears on the viewer's screen oriented as illustrated in FIG. 24 which is correct left to right and top to bottom.

Figure 26:
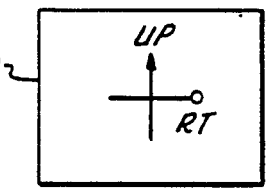

To view the second color image the film is withdrawn from the viewer and turned end for end in a horizontal plane. That is, it is rotated 180° about an axis perpendicular to the film plane. The film is then positioned in the film drawer in the orientation illustrated in FIG. 25. Now, the three color record image components B2, G2,R2 of the second image (in Col. 1, Row 1; Col. 2, Row 2; and Col. 1, Row 3) are in the optical projection paths of the three lenses (which are fixed in the viewer at Col. 1, Row 1; Col. 2, Row 2; and Col. 1, Row 3). Since these color record image components are upside down on the film, as compared to the color image components of the first image, and are similarly symmetrically placed, the color record images of the second image are now properly positioned and properly oriented to be projected on the screen and to appear on the screen as a composite color image properly oriented as shown in FIG. 26 which has correct left to right and top to bottom orientations.

The lenses of the staggered arrangement of FIG. 27 also may be arranged for X,Y adjustment of the "red" and "blue" lenses relative to the "green" lens, either manually or automatically, as described in connection with the other viewer lens arrangements discussed above.

A number of advantages result from the described modified viewer and staggered image component arrangements on the record film. The staggered configuration of the projection lenses of the viewer (as shown in FIG. 27), enables the lenses to be placed farther apart (with a given lens package boundary area). In other words, the lenses can be at a greater center to center distance, permitting projection lenses of larger diameter to be used. The resulting larger lens apertures result in a more efficient optical projection system, requiring light sources of lower power for the same screen brightness and reducing heat dissipation and cooling problems. The larger lens barrel diameters also permit design of projection lenses with less off axis vignetting which yields projected images of more uniform luminance and less color shading.

Another advantage is that the staggered positions of the three film images that make up a single image allow use of three condenser lenses which are round instead of rectangular. The staggered lens positioning avoids mechanical interference of the round condenser lenses with one another as is the case if six condenser lenses instead of three are required and if staggering of condenser lenses is not possible within the same physical envelope. This round configuration of condenser lenses without mechanical interference is illustrated in FIG. 27. Round lenses are less expensive in moderate quantities than rectangular lenses which must be either cut down from round lenses or specially molded.

Yet another advantage is that the viewer is mechanically less complex and contains fewer components than other configurations, making it both less expensive and more reliable. There is no need for mechanical movement of the film inside the viewer or any need of mechanical motion of the lenses to project the second image of a film sheet. Nor is there any need for the added complexity of switching of multiple light sources.

Camera With Buffer Storage

In the course of a diagnostic ultrasound examination which uses color imaging, many images are produced for recording. However, not all of the images are in color, because color is not necessary for all diagnostic procedures. Generally, black-and-white and color images are interspersed during the examination in no precisely predictable order. However, because the camera film format described above is different for color images than it is for black-and-white images, even though it uses the same standard 8"×10" film for each, and further, because the color films are viewed on a special viewer, whereas the black-and white films are viewed on a conventional light box, it is not practical to mix color and gray scale (black-and-white) images on a single sheet of film. For convenience of viewing, at least, it is necessary to record all of the color images from one examination on one sheet or one group of sheets of film and all of the gray scale images from the same examination on another sheet or group of sheets of film.

To this end the camera system described above is modified as illustrated in FIG. 28 to incorporate an electronic image buffer memory in the form of a hard disc drive. By incorporating the electronic image buffer memory, e.g. the hard disc drive, into the camera, the image acquisition function is separated from the image recording function. This is different than the camera system described above wherein both acquisition and recording functions take place at one time. By separating the functions, the black-and-white image signals, captured when the camera and the scanner are in their black-and-white modes, can be separated from the triads of color image component signals when the camera and the scanner are in their color modes. The two types of signals or signal sets, namely the black-and-white and the triads of color image component signals, are identified separately when they are stored in the buffer memory. Later, as they are used to form permanent optical records, they are separated so that the black-and-white image signals are recorded on one group of film sheets and the color image component signals recorded on another group of film sheets.

Figure 28:
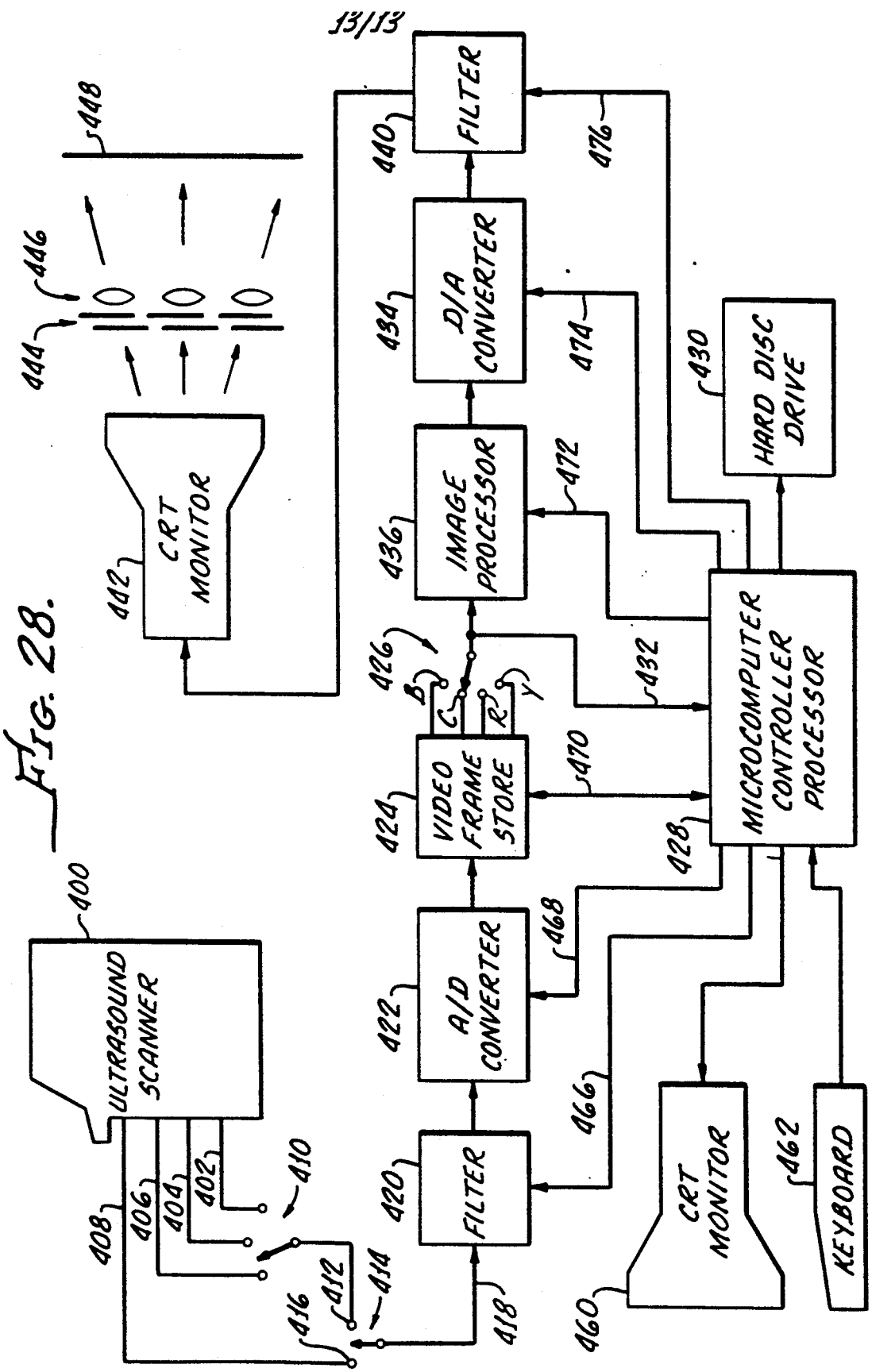
FIG. 28 is a functional block diagram of a camera having a buffer memory.

The camera system illustrated in FIG. 28 is basically identical to the camera system earlier described except for the addition of an electronic image buffer or hard disc drive and associated controls. A conventional scanner 400, such as the Acuson Model 128 or Advanced Technology Laboratories Ultramark 9 ultrasound scanner described above, provides inputs to the camera. The scanner has outputs on lines 402, 404, 406 and 408, respectively, in analog form representing the three color image components blue, green and red of a color image processed by the scanner, or, alternatively, representing on line 408 the monochrome gray-scale image of a black-and-white image processed by the scanner. The color image component signals are fed sequentially via a multiplexing switch 410 to one terminal 412 of a switch 414 that receives at its second terminal 416 the black-and-white scanner output on line 408. Switch 414 provides the scanner output video on a line 418 to a first filter 420. Switch 414 selects either the color output when the scanner is in its color mode or the black-and-white output when the scanner is in its black-and-white mode and transmits the black-and-white signal or the color image components one at a time to the filter 420.

The output of the filter is fed to an analog to digital converter 422 which digitizes the analog output of the scanner and feeds it to a video frame storage device 424, which is a dynamic random access memory (DRAM) capable of storing a single frame of black-and-white video or all three color image components of a single frame of color video. Outputs of the video frame storage 424 are fed via a switch 426 to a microcomputer controller and processor 428. Video from the video frame storage 424 is fed via the switch 426, a line 432 and the microcomputer controller to an electronic storage buffer memory, such as the hard disc drive 430. The latter has image storage locations for accepting individual digitized video signals and sets of such signals. The microcomputer controller formats each digitized video signal, that is, each monochrome signal (one frame) and each color image component signal (one frame for each component), by providing it with a header identifying the patient and the type of image signal, whether black-and-white or color. This information is stored at image storage locations on the hard disc to be selectively read out under control of the microcomputer controller from which it is sent via line 432 to a digital to analog converter 434. If deemed necessary or desirable, a digital image processor 436 may be interposed between the output of the microcomputer controller and the converter 432 or, in the alternative, the digital image processor 436 may be incorporated within the microcomputer controller processor 428. Digital to analog converter 434 converts the stored digital information extracted from the hard disc drive to analog form and feeds this through a second filter 440 to a cathode ray tube (CRT) monitor 442 that forms part of the film exposure apparatus.

In the manner described above in connection with other embodiments, the face of the monitor 442 is exposed via a system of shutters 444 and lenses 446 on a monochrome film sheet 448. For making optical records of the black-and-white images six different images are exposed on six different areas of one film sheet 448. For making optical records of color image components, as previously described, two triads of the red, green and blue color image components are exposed on the black-and-white film, which is then subsequently developed for viewing in a light box for black-and-white images or in a viewer of the type described above for color images.

A second CRT monitor 460, which may be the monitor that is normally mounted on the ultrasound cart together with the ultrasound scanner, is also connected to and controlled by the microcomputer controller processor, which has an input provided to it by a keyboard 462. This arrangement allows one or more of the images stored on the hard disc to be presented for review and organization, prior to optical recording, on the monitor 460 under control of inputs from the keyboard 462.

The microcomputer controller processor is a conventional central processing unit (CPU), such as, for example, an Intel 80486 processor based microcomputer. The microcomputer 428 exercises control and timing functions for the various components of the system via control and timing lines, including those indicated at 466,468,470,472, 474 and 476. Additional control and timing lines, not shown, are provided from the microcomputer to operate switches 410,414,426, the monitors, shutters and lenses. In an exemplary embodiment the hard disc drive has a capacity of 340 megabytes, which enables storage of more than 300 black-and-white images, or more than 100 triads of images representing color images. Video frame storage 424 is provided by a 32 megabyte DRAM. The microcomputer controller includes not only control and timing functions but controls for selection of different modes of operation and sequencing of various internal operations, such as image acquisition and display, image storage formatting software, editing control for editing display and the like.

The system illustrated in FIG. 28 may be operated under the control of the microcomputer controller processor 428 in any one of several different modes. The microcomputer controller 428 preferably is programmed to enable operator selection of any one mode. However, depending on use of the system, certain components unique to one mode may be omitted if such one mode is not to be used. In a first mode the system operates to fully automatically capture and store all images on the hard disc. No optical recording takes place until all data has been stored in the hard disc. This optical recording will begin after receipt of a signal from the sonographer that the examination is complete. In this mode all images, whether black-and-white or color, provided at the output of the scanner 400 are acquired at the operator's command during an examination. As previously mentioned, during an examination the operator (the sonographer) decides which images are to be recorded and, pressing a foot control or the like, initiates acquisition and storage of the scanner output. In this mode the scanner output is provided through the switches 410,414 to the filter 420 and analog to digital converter 422. The signals are then sent via the video frame storage and microcomputer controller for storage in the system's buffer hard disc 430. The operator controls the scanner to choose whether the image is black-and-white or color. Selecting black-and-white on the scanner automatically feeds black-and-white to the camera. If black-and-white is chosen, a single frame is digitized, identified as a black-and-white image by an appropriate header added to the digital signal, and stored in the hard disc drive 430. If the input signal is color, the separate color image component signals are digitized in sequence, fed to the video frame storage and then, via the microcomputer controller, stored in the hard disc drive after each is identified by the microcomputer controller as being a color image component signal. The three color image components of a single color image are identified as a single color image triad in the storage of the disc drive.

In this arrangement the sonographer does not need to interrupt the examination to shift between black-and-white and color. He need not change any film cassettes, even though each sheet of film of the stack of film sheets in a multi-sheet cassette can hold at the most six black-and-white images or two color images. In this first or automatic capture mode the sonographer may proceed with his examination, without interruption, and may acquire large numbers of black-and-white and/or color images in any order. The sonographer may continue to acquire and store large numbers of images in any order of black-and-white or color to achieve speed and uninterrupted continuity of examination. The sonographer does not have to interrupt examination to switch from one film cassette to another when either the film in the cassette is filled or it is decided to change from black and white imaging to color imaging.

As previously mentioned, the system described herein is not conveniently adapted to mix black-and-white images and color image components on a single sheet of film because the black-and-white images and color images are formatted differently on the film and are viewed with different equipment. For this reason the operator has to interrupt the examination, when using the system described in connection with FIG. 2, not only when all areas of a single sheet of film have been exposed, but also when changing from a black-and-white to a color image or visa versa, since each sheet of film must contain either all black and white or all color component images. Thus, the use of the buffer saves significant amounts of time, which may critical in the course of an examination.

A second alternative mode of operation is a semi-automatic image capture mode. In this mode, which also is controlled and selected by the microcomputer, when black-and-white operation is selected the image is acquired on command and immediately recorded on film. Black-and-white images are not sent to the hard disc. The camera operates like a conventional camera, with film cassettes changed by the operator when such change is called for by the camera. The camera keeps track of the recorded imaging positions on the black-and-white film. However, in this mode, when the camera is placed in its color mode by the operator, the camera operates exactly as it does in the first mode, that is, it feeds all triads of color component image signals directly to the buffer. No optical recording is made. In this mode, at the end of an examination all selected black-and-white images have already been recorded on film, and the color images have been stored as color image component triads in the buffer memory 430 from which they may be extracted subsequently as desired for optical recording.

In a third mode the camera operates in a simple black-and-white mode without any color capability. This mode may be chosen where a particular ultrasound examination requires only gray-scale images, which is a situation that occurs in a large number of examinations. In this black-and-white mode the camera behaves just as if it were a conventional black-and-white camera, capturing images on command by recording them directly on film, image by image, and requiring manual changing of film cassettes when each film sheet fills up with its six images. No data are stored on the hard disc in this mode.

In a fourth mode the camera is controlled to enable editing of a number of captured images. In this mode the ultrasound machine's console monitor 460 is employed as a display, utilizing operator control, such as the keyboard 462. All selected images are stored on the hard disc 430, either in black-and-white or color. These images are displayed selectively on the monitor 460, individually or in selected groups, and reviewed by the operator. Images may be decreased in size under control of the microcomputer and keyboard to cause miniature versions of individual images of a group of stored images to be displayed on the monitor in an array of images, such as, for example, in an array of thirty images in five columns of six rows each. Such an array of miniature images on the screen of the monitor 460 enables the order of the images to be changed so as to improve logical sequence according to the desires of the operator. The software control is arranged to enable the operator to move any one image to a different location in the array of images, with all images being appropriately displaced to maintain the general pattern of the array. In such an arrangement it may be desirable to either delete, temporarily or irrevocably certain images so as to eliminate duplicates or to select from among similar images of differing quality. Any one of the miniaturized images of the array may be selected to be enlarged to full screen size for detailed examination. Upon completion of editing and review the camera can be placed in a mode for recording of all or selected images from the hard disc drive.

In still another mode, a fifth mode, optical records are made directly from the hard disc. A film cassette is inserted and the camera proceeds to record initially all of the black-and-white images from the hard disc in a conventional six image format on the film, image by image, signalling the operator when each sheet of film is full for a single sheet cassette or when all sheets are full for a multi-sheet cassette, so as to enable changing of the film cassette, and again signalling when all black-and-white images from the hard disc have been optically recorded. Upon completion of optical recording of all black-and-white images read from the hard disc, the camera will proceed under control of the microcomputer to optically record all of the color image components, extracting these from the hard disc and sending them to the camera monitor 442 via the converter 434 and filter 440. These color image components are optically recorded, triad by triad, until all desired images have been extracted from the hard disc and optically recorded. In this mode of operation the microcomputer selects for reading from the hard disc those stored image signals having the appropriate headers identifying either black-and-white image signals or triads of color image component signals.

It is contemplated that whether or not there is any editing, as mentioned above, image signals that have been stored on the hard disc drive 430 will be extracted image by image, first the black-and-white image signals and then the triad color image component signals (or visa versa) on the completion of each ultrasound examination. Having optically recorded, on one or more sheets of film, all of the images of a given examination, the camera is ready for the next patient or the next examination. Images acquired on subsequent examinations or for subsequent patients are written directly into the hard disc drive over information that has been previously written therein. Since optical exposure time for a single black-and-white image is typically one second, and for a triad of color image components is typically three seconds, and with a typical examination resulting in thirty images, total optical recording time is quite small.

As still another mode of operation the hard disc drive 430 may be removable so that it can be utilized to acquire a group of images and then transported to another camera at a remote location at which optical images can be formed. An arrangement of this type is described above.

In an alternate configuration of the camera illustrated in FIG. 28 the output digital to analog converter 434, filter 440 and monitor and optical recording apparatus, including monitor 442, shutters 444, lenses 446 and film 448, all may be omitted from a camera, which would then only include the ultrasound scanner, microcomputer controller, hard disc drive and the components necessary to transmit signals from the ultrasound scanner for storage on the hard drive. In such a configuration the hard drive is removable and is transportable to a different location for optical recording of the stored signals in the manner set forth above.

It summary, it will be seen that the camera system illustrated in FIG. 28 effectively carries out three separate procedures. The first of these is image acquisition or storage in which images provided from the ultrasound scanner are digitized and stored on the hard disc, either as color or monochrome images. The second procedure is image editing in which stored images are reduced to thumbnail-sized images and displayed as an array of many images on the screen of the ultrasound monitor 460 for operator preview. In this second procedure any single image may be displayed at full size for closer examination. The third procedure of the camera operation is optical recording in which signals or sets of signals are selected by the operator for extraction from the hard disc drive in an order selected by the operator, and each of these is then fed to through the digital to analog converter, filter, monitor, shutters and lenses for exposure of the sheet film.

Input video signals from the ultrasound scanner 400 are treated individually, with the machine accepting the three component red, green, blue video signals or a single monochrome video signal. Each video signal is filtered, via filter 420, which is preferably an anti-aliasing filter. This filter is an analog linear phase filter capable of rolling off the video signal to a level of 48 db down at 40 megahertz, thus cutting off high frequencies. The filter has a flat zero attenuation response from DC to about 36 megahertz, at which frequency the high frequency roll off begins. The purpose of this filter is to sufficiently suppress video frequency components that exceed 40 megahertz, which would be aliased to erroneous frequencies if digitized.

Following the anti-alias filter is the analog to digital converter 422, preferably formed of a single chip device capable of 8 bit digitization at a sample rate of 40 megahertz. A phase lock loop circuit in microcomputer controller 428 locks to the video signal's horizontal sync signal and generates a phase lock sampling clock at a 40 megahertz rate. This clock, derived from the microcomputer controller processor, clocks the converter 422, which provides one 8 bit digital video value (a single pixel) every 25 nanoseconds in an exemplary embodiment. The digitized video samples are stored in the DRAM frame memory 424, which is addressed sequentially and capable of writing and reading all 8 bits of one pixel every 25 nanoseconds. The DRAM memory size is preferably sufficient to store an image of 484 lines of 2,000 pixels each, or roughly 1 megabyte of memory. When following acquisition procedure the image data is written to this frame memory 424 from the analog to digital converter 422. Data from the frame memory 424 is fed through the microcomputer controller processor for storage in the hard disc. When images are edited, data is loaded to the frame memory 424 from the hard disc 430 via the microcomputer controller processor and then, via the microcomputer controller processor, which includes a video SVGA card, the data are fed to the monitor 460 for display. For optical recording, stored image data from the hard drive are fed via the microcomputer controller processor and through the digital to analog converter 434, which also may be a single chip device capable of 8 bit conversion at a sampling rate of 40 megahertz. This converter is clocked with the same signal that clocks the converter 422. Each video signal from the converter 434 is filtered through a post-aliasing filter 440, which is similar to the anti-aliasing filter 420. Filter 440 is an analog linear phase filter capable of rolling off a video signal to be down 48 db at 40 megahertz. Again, this filter has a flat zero attenuation response from DC to about 36 megahertz. The purpose of this filter is to sufficiently suppress digital to analog stair-step artifacts that exceed 40 megahertz and which might degrade appearance of the video.

Although a CRT-based camera is described in connection with FIG. 28, it will be readily understood that other means of recording images on film, including those described in connection with earlier described embodiments, such as a laser scanning camera, are just as well suited to use in the system of FIG. 28 as a CRT-based camera.

It will be understood that the camera film holder may hold a single sheet of standard 8"×10" film, or possibly two. Alternatively the film holder may comprise a so-called bulk loader where a number of sheets are in a stack from which sheets are fed one by one to an exposing station, with exposed sheets accumulating in another cassette.

Although the several systems described herein all use three separate colors to form a single full color image, it will be understood that principles of the invention may be applied by using other numbers of separate colors (or other colors), such as, for example, two separate colors, or four separate colors. For example, the viewer may project light of different spectral content in its several paths. Blue, green and red light beams are generally in the range of 4–500, 5–600 and 6–700 nanometers, respectively, but other spectral ranges and contents and other numbers of separate image components may be employed.

There have been described systems and methods for color imaging, particularly useful for images initially embodied in electrical color component signals, and particularly useful for medical diagnostic imaging using standard black-and-white sheet film and standard processing systems and providing in the viewer color records having all of the advantages of black-and-white film records.

What is claimed is:

1. A medical diagnostic color imaging system for use with a medical diagnostic scanning device that provides an output having a plurality of electrical color image component output signals respectively representing different optical color image components of a color image of a subject scanned by said device, said system comprising:

input means for providing sets of electrical color image component input signals wherein the signals of each set represent different optical color image components of an image of a subject scanned by said device, memory means having a plurality of image storage locations, each said location being configured and arranged to store a set of electrical color image component input signals respectively representing the different optical color image components of an image of the subject scanned by said scanning device, means for storing a plurality of sets of said electrical color image component input signals at different ones of said storage locations, film holder means configured and arranged to hold monochromatic film, and means responsive to said memory means for exposing a plurality of optical record color image components on different areas of film in said film holder means, each of said optical record color image components comprising an optical record of a different one of said optical color image components of a color image of a subject scanned by said device.

2. The system of claim 1 wherein said means for exposing includes means alternatively responsive to said input means or to said memory means.

3. The system of claim 1 wherein said medical diagnostic scanning device provides an alternative output comprising a monochromatic image signal representing a monochromatic image of a subject scanned by said device, means for controlling said input means to selectively provide either said sets of electrical color image component input signals or said monochromatic image signal, said means for storing including means for storing a plurality of said monochromatic image signals at different ones of said image storage locations, said means for exposing comprising means for selectively reading from said memory means either a set of said color image component input signals or a monochromatic image signal.

4. The system of claim 3 wherein said means for exposing includes means for alternatively exposing said areas of said film in a color image component sequence or in a monochromatic image sequence.

5. A method of forming medical diagnostic optical record color images for use with a medical diagnostic color scanning device that provides an electrical output having sets of electrical signals wherein signals of each set respectively represent different color image components of a color image of a subject scanned by said scanning device and wherein each set represents a different image of a subject, said method comprising the steps of:
   storing a plurality of said sets in a storage medium,
   reading a selected one of said sets from said storage medium after a plurality of said sets have been stored, and
   employing each set read from said storage medium to form on a monochromatic film a plurality of mutually spaced optical record color image components that respectively represent different color image components of a color image of a subject scanned by said scanning device.

6. The method of claim 5 including the steps of processing said monochromatic film to fix said optical record color image components thereon, and forming on a viewing medium a plurality of mutually superposed projected images of said optical record color image components of said processed film, said step of forming on a viewing medium comprising projecting each of said superposed projected images with a different spectral content so as to combine the projected images of different spectral content on the viewing medium to form a single multi-color image.

7. The method of claim 5 wherein said scanning device provides an alternative electrical output having a monochromatic electric signal representing a monochromatic image of a subject, and including the steps of storing a plurality of said monochromatic electrical signals in said storage medium, reading selected ones of said monochromatic electrical signals from said storage medium after a plurality of monochromatic electrical signals have been stored, and employing the monochromatic electrical signals read from said storage medium to form on a second monochromatic film a plurality of monochromatic images.

8. A medical diagnostic color imaging system for use with a medical diagnostic scanning device that generates a first color output having a plurality of color image component electrical signals respectively representing different color image components of a color image of a subject scanned by said device, or an alternative second monochromatic output having a monochromatic electrical signal representing a monochromatic image of a subject scanned by said device, said system comprising:
   input means for providing sets of electrical color image component input signals wherein the signals of each set represent different optical color image components of a color image of a subject scanned by said device, and for providing electrical monochromatic input signals each representing a different monochromatic image of a subject scanned by said device, said sets of electrical color image component input signals and said electrical monochromatic input signals being provided sequentially in the order in which they are generated by said scanning device,
   memory means having a plurality of image storage locations, each said location being configured and arranged to store a set of electrical color image component input signals respectively representing the different optical color image components of a single color image of a subject scanned by said scanning device, or an electrical monochromatic input signal representing a monochromatic image of a subject scanned by said scanning device,
   means for storing a plurality of sets of said color electrical color image component input signals and a plurality of said electrical monochromatic input signals at different ones of said storage locations,
   film holder means configured and arranged to hold monochromatic film, and
   means for selectively reading from said memory means a first group of said sets of electrical color image component input signals and consecutively forming on a first film in said film holder means an exposed optical record of a sequence of the sets of said first group, or selectively reading a second group of said monochromatic signals and consecutively forming on a second film in said film holder means an exposed optical record of a sequence Of the monochromatic input signals of said second group, whereby said scanning device may be operated to generate color and monochromatic outputs in any sequence, and a group of the color outputs of the scanning device may be employed consecutively to make a group of consecutive optical records of color images and a group of monochromatic outputs of the scanning device may be employed consecutively to make a group of consecutive optical records of monochromatic images, regardless of the order in which said first color and second monochromatic outputs are generated by said scanning device.

9. A medical diagnostic imaging system for use with a medical diagnostic scanning device that generates electrical outputs of first and second types in a varying sequence, and that intermixes outputs of different types, all of which outputs must be grouped according to type, each output representing a first or second type of image of a subject scanned by said device, said system comprising:
   memory means for storing said outputs as electrical signals of first and second types respectively corresponding to said electrical outputs of said first and second types,
   means for selectively extracting from said memory means first or second groups of signals, wherein all signals of said first group comprise signals of said first type of electrical signals, and all signals of said second group comprise signals of said second type of electrical signals, and
   means responsive to said extracting means for making first and second sets of optical records of said groups of signals, whereby said first set of optical records comprises a plurality of records each representing an image of said first type, and said second set of optical records comprises a plurality of records each representing an image of said second type.

10. The system of claim 9 wherein said means for making sets of optical records comprise film holder means having film held therein, and means for consecutively exposing on film in said film holder means a plurality of optical records of the same type.

11. The system of claim 10 wherein said records of said first set of optical records each comprises a plurality of monochromatic color image components of a color image, and wherein records of said second set of said optical records comprise a plurality of monochromatic images, whereby a plurality of color image optical records are formed in consecutive sequence and a plurality of monochromatic image optical records are formed in consecutive sequence.

12. The system of claim 10 including an ultrasound diagnostic imaging cart, said cart carrying all of said medical diagnostic scanning device, said memory means, said means for reading from said memory, and said means for making sets of optical records.

* * * * *